(12) United States Patent
Miller et al.

(10) Patent No.: US 10,091,754 B2
(45) Date of Patent: Oct. 2, 2018

(54) CORRECTING INTERFERENCE OF NON-LINE-OF-SIGHT SIGNALS

(71) Applicant: Apple Inc., Cupertino, CA (US)

(72) Inventors: Isaac Thomas Miller, El Granada, CA (US); Jonathan Schoenberg, Fishers, IN (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 14/719,252

(22) Filed: May 21, 2015

(65) Prior Publication Data

US 2015/0341886 A1    Nov. 26, 2015

Related U.S. Application Data

(60) Provisional application No. 62/013,115, filed on Jun. 17, 2014, provisional application No. 62/001,581, filed on May 21, 2014.

(51) Int. Cl.
| | |
|---|---|
| *H04W 56/00* | (2009.01) |
| *H04B 7/185* | (2006.01) |
| *H04W 4/02* | (2009.01) |
| *G01S 19/42* | (2010.01) |

(Continued)

(52) U.S. Cl.
CPC ....... *H04W 56/0095* (2013.01); *G01S 5/0273* (2013.01); *G01S 19/428* (2013.01); *H04B 7/18513* (2013.01); *H04W 4/025* (2013.01); *H04W 56/003* (2013.01); *G01S 19/06* (2013.01)

(58) Field of Classification Search
None
See application file for complete search history.

(56) References Cited

U.S. PATENT DOCUMENTS 6,282,426 B1 * 8/2001 Wang .................... G01S 5/0036
                                                                  342/450
6,487,417 B1   11/2002 Rossoni et al.
(Continued)

FOREIGN PATENT DOCUMENTS

| EP | 2 562 561 | 2/2013 |
|---|---|---|
| WO | WO 2000/075683 | 12/2000 |
| WO | WO 2008/067082 | 6/2008 |

OTHER PUBLICATIONS

International Search Report and Written Opinion in International Application No. PCT/US2015/032064, 23 pages.
(Continued)

*Primary Examiner* — Chirag G Shah
*Assistant Examiner* — Suk Jin Kang
(74) *Attorney, Agent, or Firm* — Fish & Richardson P.C.

(57) ABSTRACT

Systems, methods, and computer program products for determining a location from non-line-of-sight (NLOS) signals are described. A processor can determine that multipath interferences of a signal reaching a receiver through different paths that are close in lengths may be mistakenly interpreted as additional time shift, (e.g., additional time delay or, in some cases, time advance) of the signal in calculating a timing of the signal. The processor can determine the possible differences between path lengths and then determine an amount of the additional time shift. The processor can determine a shift correction to remove effects caused by the additional time delay from the timing calculation.

13 Claims, 16 Drawing Sheets

(51) Int. Cl.
*G01S 5/02* (2010.01)
*G01S 19/06* (2010.01)

(56) References Cited

U.S. PATENT DOCUMENTS

| | | | |
|---|---|---|---|
| 2002/0089450 A1* | 7/2002 | Dowdle | G01S 5/02 342/453 |
| 2007/0171936 A1 | 7/2007 | Hazra et al. | |
| 2008/0132174 A1* | 6/2008 | Corral | H04B 17/3912 455/67.16 |
| 2009/0102711 A1 | 4/2009 | Elwell, Jr. | |
| 2009/0144037 A1 | 6/2009 | Sibecas et al. | |
| 2010/0309051 A1* | 12/2010 | Moshfeghi | G01S 5/0236 342/378 |
| 2011/0256882 A1* | 10/2011 | Markhovsky | G01S 3/74 455/456.1 |
| 2013/0023285 A1* | 1/2013 | Markhovsky | G01S 3/74 455/456.1 |
| 2013/0045754 A1* | 2/2013 | Markhovsky | G01S 3/74 455/456.1 |
| 2013/0051434 A1 | 2/2013 | Draganov et al. | |
| 2013/0063307 A1* | 3/2013 | Krasner | G01S 19/05 342/387 |
| 2013/0063308 A1* | 3/2013 | Krasner | G01S 19/05 342/393 |
| 2013/0143595 A1* | 6/2013 | Moshfeghi | G01S 5/0236 455/456.1 |
| 2013/0271324 A1 | 10/2013 | Sendonaris et al. | |
| 2013/0278465 A1 | 10/2013 | Owen | |
| 2013/0278466 A1 | 10/2013 | Owen | |
| 2014/0274126 A1 | 9/2014 | Sendonaris et al. | |
| 2015/0256972 A1* | 9/2015 | Markhovsky | H04W 4/023 455/456.1 |
| 2015/0346333 A1* | 12/2015 | Soto | G01S 13/08 702/143 |
| 2016/0146922 A1* | 5/2016 | Moshfeghi | G01S 5/0236 455/456.6 |
| 2016/0192144 A1* | 6/2016 | Markhovsky | H04W 4/023 455/456.1 |
| 2016/0366554 A1* | 12/2016 | Markhovsky | G01S 3/46 |

OTHER PUBLICATIONS

Yu et al., "Research on radio propagation modeling of city impact in 3D perspective," 2013 Int'l Conf on Wireless Comm and Signal Processing, Oct. 24, 2013, pp. 1-5.

Invitation to Pay Additional Fees and, Where Applicable, Protest Fee in International Application No. PCT/US2015/032064, dated Sep. 7, 2015, 8 pages.

Banin et al., "Next Generation Indoor Positioning System Based on WiFi Time of Flight," Proceedings of 26$^{th}$ Int'l Technical Meeting of ION Satellite Division, Sep. 16-20, 2013, pp. 975-982.

Obst et al., "Urban Multipath Detection and Mitigation with Dynamic 3D Maps for Reliable Land Vehicle Localization," Proceedings of IEEE/ION Plans 2012, Apr. 26, 2012, pp. 685-691.

* cited by examiner

CORRECTING INTERFERENCE OF NON-LINE-OF-SIGHT SIGNALS

CROSS-REFERENCE TO RELATED APPLICATIONS

This application claims priority to U.S. Provisional Patent Application No. 62/013,115, entitled "Positioning Using Non-Line of Sight Signals," filed on Jun. 17, 2014, and U.S. Provisional Patent Application No. 62/001,581, entitled "Positioning Using Non-Line of Sight Signals," filed May 21, 2014, the entire contents of each of which are incorporated herein.

TECHNICAL FIELD

This disclosure relates generally to location determination using radio signals.

BACKGROUND

In radio frequency (RF) signal environments, signals from a transmitter sometimes bounce off from physical objects before reaching an antenna of a receiver. Both a direct line-of-sight (LOS) signal and reflected signals may arrive at the antenna of the receiver at different times. This phenomenon is referred to as multipath interference. If a reflected signal path length is not much longer than a direct path length on a scale of the RF signal structure, the reflected signals may interfere with the true signal, causing interference. If the reflected signal path length is much longer than the direct path length, the receiver may detect multiple distinct correlation peaks. Multipath interference may affect operations of a global navigation satellite system (GNSS) receiver. A GNSS receiver configured to determine a location using RF signals from GNSS satellites may provide an inaccurate location solution when multipath effect causes interference and distortion of the RF signals.

SUMMARY

Techniques for determining a location from non-line-of-sight (NLOS) signals are described. A processor can determine that multipath interferences of a signal reaching a receiver through different paths that are close in lengths may be mistakenly interpreted as additional time shift, (e.g., additional time delay or, in some cases, time advance) of the signal in calculating a timing of the signal. The processor can determine the possible differences between path lengths and then determine an amount of the additional time shift. The processor can determine a shift correction to remove effects caused by the additional time delay from the timing calculation.

The features described in this specification can achieve one or more advantages. For example, a device can determine its location with improved accuracy in an urban environment where multiple buildings can reflect the GNSS signals. The device can determine a location in streets among tall buildings, e.g., a downtown area surrounded by high-rise buildings, where LOS signals from a GNSS satellite are unavailable and where conventional GNSS receivers that depend on LOS signals cannot determine a location.

The details of one or more implementations of the subject matter are set forth in the accompanying drawings and the description below. Other features, aspects, and advantages of the subject matter will become apparent from the description, the drawings and the claims.

BRIEF DESCRIPTION OF THE DRAWINGS

Like reference symbols in the various drawings indicate like elements.

DETAILED DESCRIPTION

Multipath Signals

Figure 1:
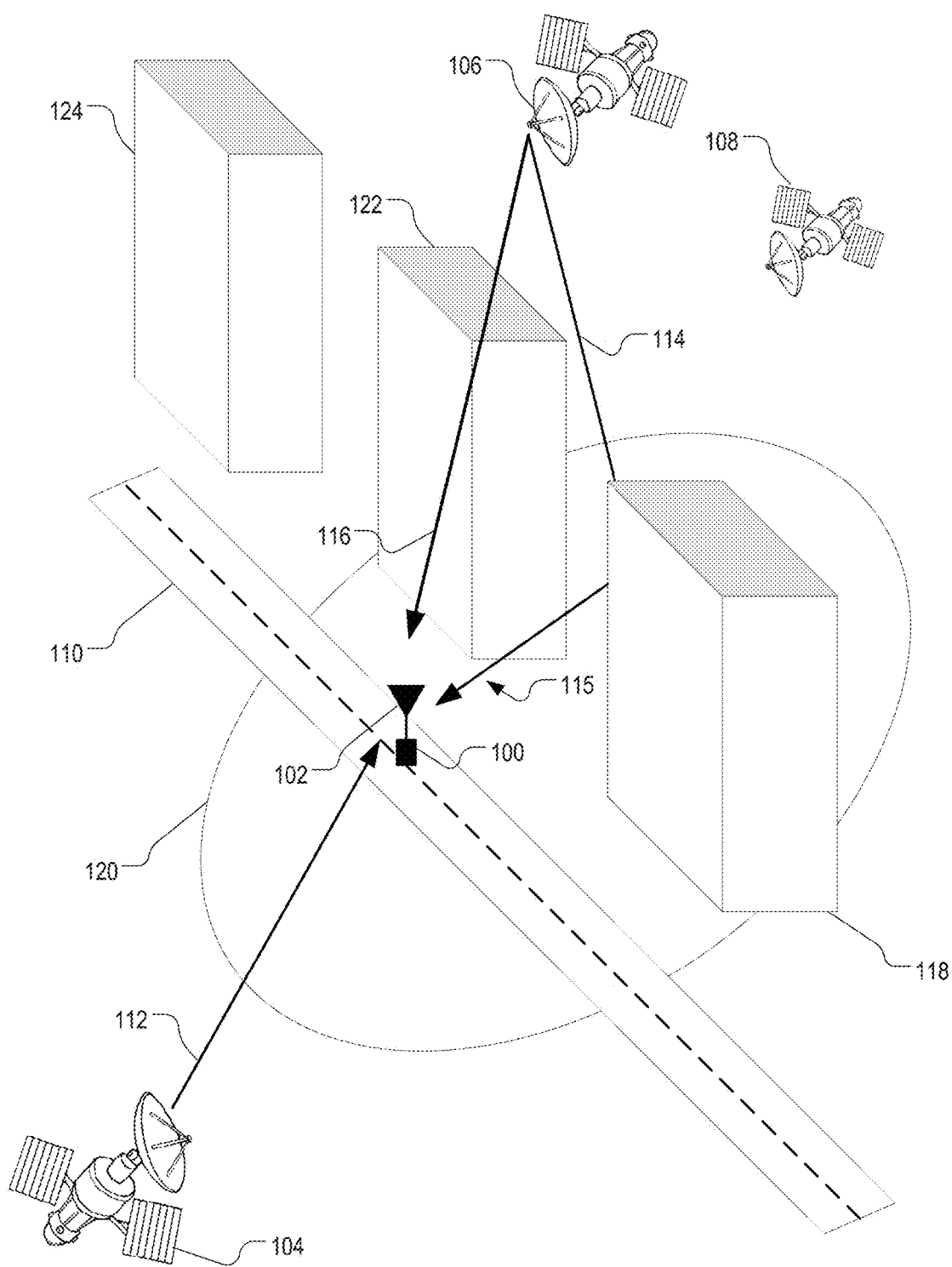
FIG. 1 is a diagram illustrating an example processor handling signals from multiple transmitters.

FIG. 1 is a diagram illustrating an example processor 100 configured for processing RF signals from multiple transmitters (e.g., satellite transmitters). In some implementations, processor 100 is a hardware processor embedded in a mobile device and configured to process RF signals (e.g., GNSS signals) from one or more transmitters. Processor 100 can be coupled to or be a component of an RF receiver having antenna 102. In general, the receiver can be an RF receiver programmed to receive RF signal from any RF signal source. In particular, in examples in this specification, the receiver can be a GNSS receiver programmed to receive signals from GNSS satellites. However, the features can be implemented for other positioning technologies that use non-satellite RF signals (e.g., land-based positioning signals) to determine a location. In the example shown, antenna 102 can detect signals from satellites 104, 106 and 108 when antenna 102 is located at a particular location (e.g., on road 110) at a particular time.

At least some signals from satellites 104, 106 and 108 can reach antenna 102 through one or more reflections. In the example shown, signals from satellites 104, 106 reach antenna 102 through signal paths 112, 114, respectively. Signal path 114 includes reflection path 115 caused by the signal reflecting off a surface of building 118. Reflection path 115 causes the signal from satellite 106 to travel a total path length that is longer than direct LOS path 116 from satellite 106 to antenna 102.

Processor 100 can use knowledge of surrounding structures, such as buildings 118, 122, 124, to determine possible reflection paths and respective delays of signals caused by those reflection paths. In some implementations, processor 100 can obtain initial location bound 120 defining a geographic area that includes possible locations of antenna 102 determined using GNSS signals without multipath correction, Wi-Fi™ trilateration, cellular information or other location determination methods. Initial location bound 120 can have a size (e.g., a radius if a circular bound) corresponding to an error margin of the location. Initial location bound 120 can have any size or shape (e.g., circular, elliptical, square). In some implementations, initial location bound 120 is a grid divided into a number of grid cells. Each grid cell can correspond to a possible location of antenna 102. The grid cells can be spaced apart from one another according to a precision of the GNSS receiver under ideal conditions (e.g., one meter apart).

Processor 100 can obtain, from local cache or a network database, features of structures that may reflect signals reaching initial location bound 120. The features can include reflective surfaces of buildings 118, 122 and 124. Processor 100 can obtain locations of satellites 104, 106 and 108 from the GNSS signals or from a network resource. Using initial location bound 120, the structural features and the satellite locations, processor 100 can compute feasible reflection paths for signals from satellites 104, 106 and 108 to one or more locations in a set of possible locations of antenna 102. The term "feasible path" means that given the estimated location of antenna 102 and the location of a satellite transmitter, an actual satellite signal transmitted by the satellite transmitter is capable of taking the feasible path to reach antenna 102 without being completely obstructed by a physical object. Processor 100 can designate the satellites whose signal paths are statistically stable across the possible estimated antenna positions in location bound 120 as safe satellites for use in a location determination. A transmitter's signal path to a receiver is "statistically stable" if the path by which the transmitter's signal reaches the antenna for most candidate antenna positions is similar in path length and reflecting surfaces. That is, as the algorithm iterates over candidate antenna positions, the feasible signal path includes the same reflecting surfaces. Processor 100 can compute corrections for those satellites during the calculation of feasible paths.

Given the complexity of geographic features in initial location bound 120, determining multiple possible signal paths may be an NP-complete problem. Processor 100 can apply one or more constraints to simplify the determining of signal paths. For example, processor 100 can reject NLOS signals with significant delay when an LOS signal is available. The rejection may reduce multipath interference to the order of millions. Processor 100 can also designate each reflective surface having a normal vector parallel to the ground as a facet. By designating the facets as such, processor 100 can reduce a three-dimensional (3D) signal propagation problem to a two-dimensional signal propagation problem. Processor 100 can then designate a transmitter altitude as a linear function of distance travelled, as represented below in formula 1.

$$Alt = D * \sin(E), \quad (1)$$

where Alt is transmitter altitude, D is a distance a signal travelled, and E is an angle over the horizon at which the signal is observed by antenna 102.

In some implementations, processor 100 can determine feasible paths for the signal to travel by constructing and traversing a tree data structure. Processor 100 can limit the size of the tree data structure and thereby limit the number of calculations to perform. Limiting the size of the tree data structure can include limiting the number of reflections in calculating multiple signal paths. For example, processor 100 may set a constraint that the number of reflections to be considered is zero (only the LOS signal is present) or one (only one reflection in NLOS signals is present). More details on constructing and traversing the tree data structure are described in reference to FIGS. 4A and 4B.

In some implementations, limiting the size of the tree data structure can include representing a physical object (e.g., a building) by a limited number of rectangular surfaces (e.g., less than 10 facets).

In some implementations, computation complexity can be limited by assuming that processor 100 can compute an initial location solution with an uncertainty to correspond to an average size of a surface of a building (e.g., on the order of 100 meters). The uncertainty can correspond to the uncertainty of estimated location of antenna 102, which can be represented by the size of initial location bound 120. Additionally, processor 100 can designate a distance between each of satellites 104, 106, 108 and antenna 102 to be infinity or a large number so that processor 100 can assume that a respective LOS vector from each point located in initial location bound 120 to a given satellite is in a same direction.

Using the above-described constraints, processor 100 can correct the location solution error due to signal reflection by correcting the range error caused by the additional path length in NLOS or reflected signal paths when a surface of a physical object obstructs and reflects the LOS signal.

Figure 2:
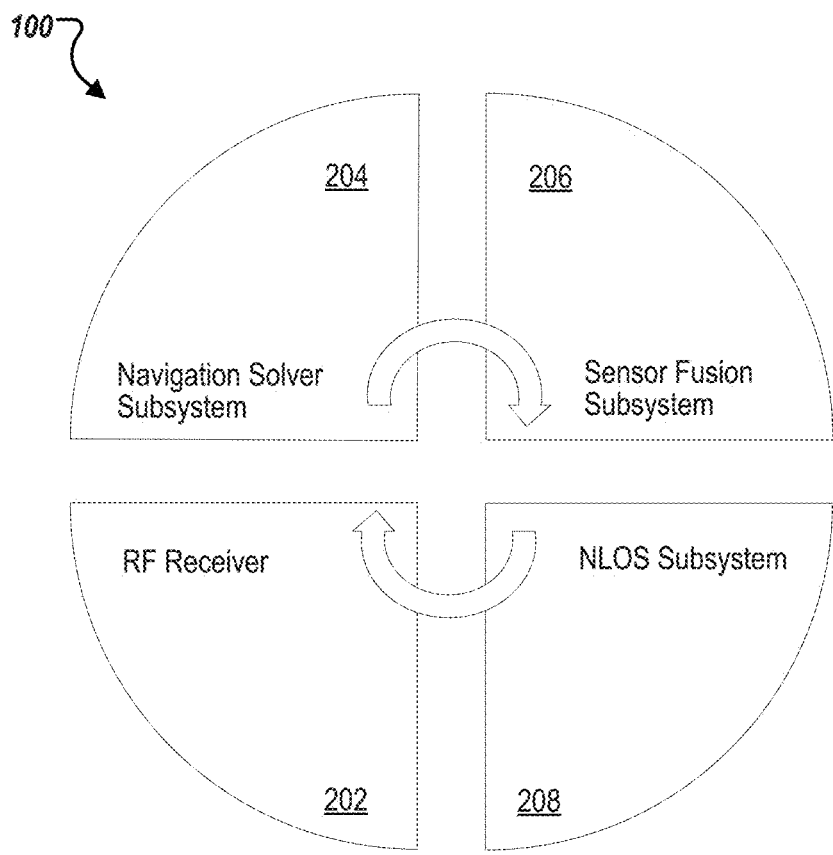
FIG. 2 is a diagram illustrating components of an example processor and interactions between the components.

FIG. 2 is a diagram illustrating components of the example processor 100 shown in FIG. 1 and interactions between the components. Processor 100 can be included in or coupled to RF receiver 202. RF receiver 202 can be a GNSS receiver include electronic circuitry configured to acquire GNSS satellite RF signals and track the GNSS satellites, produce one or more GNSS observables that include travel time of a GNSS signal from a GNSS satellite to RF receiver 202 and decode one or more ephemerides broadcast from the GNSS satellites that indicate locations of the GNSS satellites. RF receiver 202 can include, or be coupled to, an antenna (e.g., antenna 102).

Processor 100 can include location solver subsystem 204. Location solver subsystem 204 can include electronic circuitry, software, firmware, or a combination of the above. Location solver subsystem 204 can generate a location solution, also referred to as navigation solution that includes an estimated location of RF receiver 202. For example, location solver subsystem 204 can implement a Kalman filter or other state estimator for estimating location and other navigations states (e.g., speed). Location solver subsystem 204 can generate a covariance matrix of signal phase measurements. Location solver subsystem 204 can monitor the observables (e.g., pseudorange measurements, delta pseudorange measurements, C/No measurements) provided by RF receiver 202. In some implementations, location solver subsystem 204 can perform receiver autonomous integrity monitoring (RAIM) functions.

In some implementations, processor 100 can include sensor fusion subsystem 206. Sensor fusion subsystem 206 can include electronic circuitry, software, firmware or a combination of the above. Sensor fusion subsystem 206 integrates a location solution from location solver subsystem 204 with a location estimate from other sources to determine an initial location bound. In some implementations, sensor fusion subsystem 206 can implement a Kalman filter or other state estimator for estimating location based on GNSS data, Wi-Fi or other wireless data, cellular data and data from one or more inertial sensors. The initial location bound can include a location and an uncertainty range. The location in the initial location bound can include the location solution determined by location solver subsystem 204. Sensor fusion subsystem 206 can adjust the location solution according to readings from the one or more sensors. The one or more sensors can include at least one of an accelerometer, a gyroscope or a magnetometer. Sensor fusion subsystem 206 can adjust the location solution based on context constraints that limit movement of RF receiver 202. Sensor fusion subsystem 206 can adjust the location using location determined based on non-GNSS RF signals. These signals can include, for example, Wi-Fi™ or cellular signals.

Processor 100 can include NLOS subsystem 208. NLOS subsystem 208 can include circuitry, software, firmware or a combination of the above. NLOS subsystem 208 analyzes the received GNSS signals using initial location bound 120 and recommends to RF receiver 202 and location solver subsystem 204 one or more satellites to track and to use in location determination. NLOS subsystem 208 can recommend pseudorange corrections for signals from those recommended satellites, as described below in reference to calculation (2). NLOS subsystem 208 can provide information on effects of signal reflections on a location solution for correcting those effects to navigation solver subsystem 204. The information can include range correction Jacobians, which are described in additional detail below.

NLOS subsystem 208 can receive a current location solution from location solver subsystem 204. The location solution can include Earth-centered, Earth-fixed (ECEF) coordinates represented in meters or other desired units, or coordinates in other reference frames. Optionally, sensor fusion subsystem 206 can adjust the location solution using a location estimation determined using other sensors. For example, using a Kalman filter formulation.

The location solution received by NLOS subsystem 208 can include a current position covariance matrix from location solver subsystem 204. The position covariance matrix can be an estimated mean square error (MSE) matrix. In addition, NLOS subsystem 208 can receive a list of satellites used in a current location solution from location solver subsystem 204. The list of satellites can include a list of satellites that RF receiver 202 tracked. NLOS subsystem 208 can receive, from location solver subsystem 204, measured pseudoranges of the tracked satellites at the time the location solution was computed. The pseudoranges can have a unit in meters or other length units (e.g., feet). NLOS subsystem 208 can receive carrier-to-noise density (C/N$_0$) for each tracked satellite from location solver subsystem 204. The carrier-to-noise density can be expressed in decibel-Hertz (dB-Hz). NLOS subsystem 208 can receive, from location solver subsystem 204, ECEF positions (e.g., in meters) at time of signal transmit. The ECEF positions can be expressed in ECEF reference frame at time of computed location solution.

NLOS subsystem 208 can provide, to location solver subsystem 204, a list of recommended satellites to use in determining a next location solution. NLOS subsystem 208 can provide, to location solver subsystem 204, a corresponding list of pseudorange corrections ("$\delta_{NLOS}$") to be used for the recommended satellites. Location solver subsystem 204 can then determine a range, in a next location solution calculation, by taking the pseudorange corrections $\delta_{NLOS}$ into calculation (2) listed below.

$$\rho = R + c(\delta_r - \delta^s) + \delta_{NLOS} + \varepsilon, \quad (2)$$

where $\rho$ is a pseudorange between a receiver and a satellite, R is a true range between the receiver and the satellite, $\delta_r$ is a receiver clock error, $\delta^s$ is a satellite clock error, c is a speed of light, $\delta_{NLOS}$ is the pseudorange correction provided by NLOS subsystem 208, and $\varepsilon$ is a random tracking error.

NLOS subsystem 208 can provide, to location solver subsystem 204, a list of sigmas $\sigma_\delta$ for pseudorange corrections. $\sigma_\delta$ can represent estimated standard deviation of the pseudorange correction $\delta_{NLOS}$. $\sigma_\delta$ can capture the statistical distribution of $\delta_{NLOS}$ over the set of possible antenna positions. NLOS subsystem 208 can provide, to location solver subsystem 204, a list of range correction Jacobians $$\frac{\partial \delta_{NLOS}}{\partial *}$$

for recommended satellites to use. The Jacobians can be computed with regard to receiver ECEF location at time of computed location solution and with regard to satellite ECEF position at time of signal transmit, each expressed in ECEF frame at time of computed location solution. Additional details of determining the recommended satellites, pseudorange corrections $\delta_{NLOS}$, list of sigmas $\sigma_\delta$ and list of range correction Jacobians are described in reference to FIGS. 4A and 4B.

Figure 3:
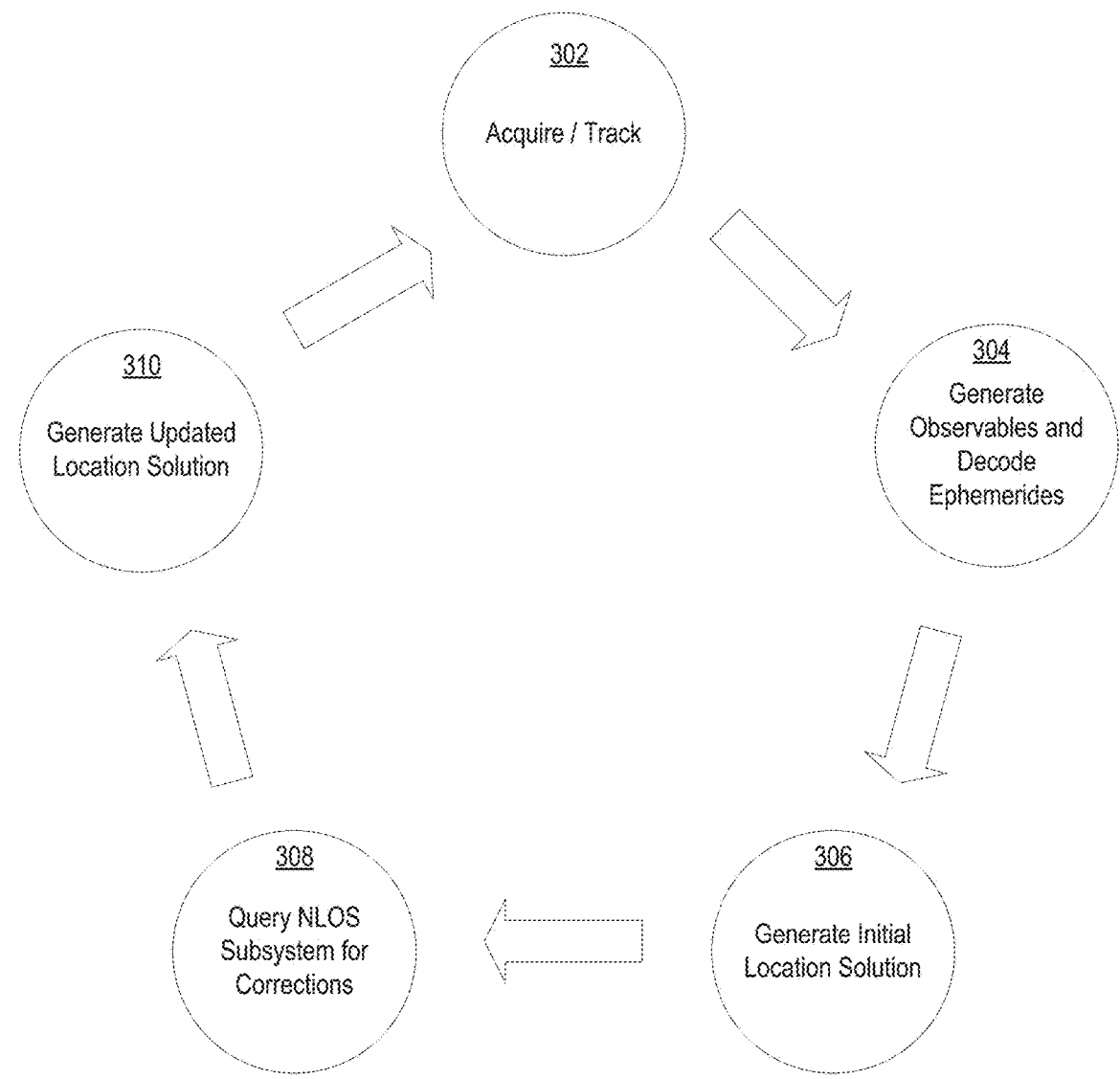
FIG. 3 is a diagram illustrating an example workflow of a location solver subsystem of a processor

FIG. 3 is a diagram illustrating an example workflow of location solver subsystem 204 of processor 100. Location solver subsystem 204 can acquire (302) and track one or more RF signal sources (e.g., GNSS satellites) using RF receiver 202 of FIG. 2. Location solver subsystem 204 can then generate (304) one or more observables, and decode ephemerides of the GNSS satellites using RF receiver 202 of FIG. 2. Location solver subsystem 204 can generate (306) initial location solution of RF receiver 202. Location solver subsystem 204 can query (308) NLOS subsystem 208 of FIG. 2 for corrections and receive the corrections. Location solver subsystem 204 can generate (310) an updated location solution that incorporates the received corrections in location calculations. Location solver subsystem 204 can repeat stages 302 through 308 to produce a next location. The repetitions can occur at a predetermined frequency (e.g., 1 Hz) or at a frequency corresponding to the speed of the calculations.

Figure 4A:
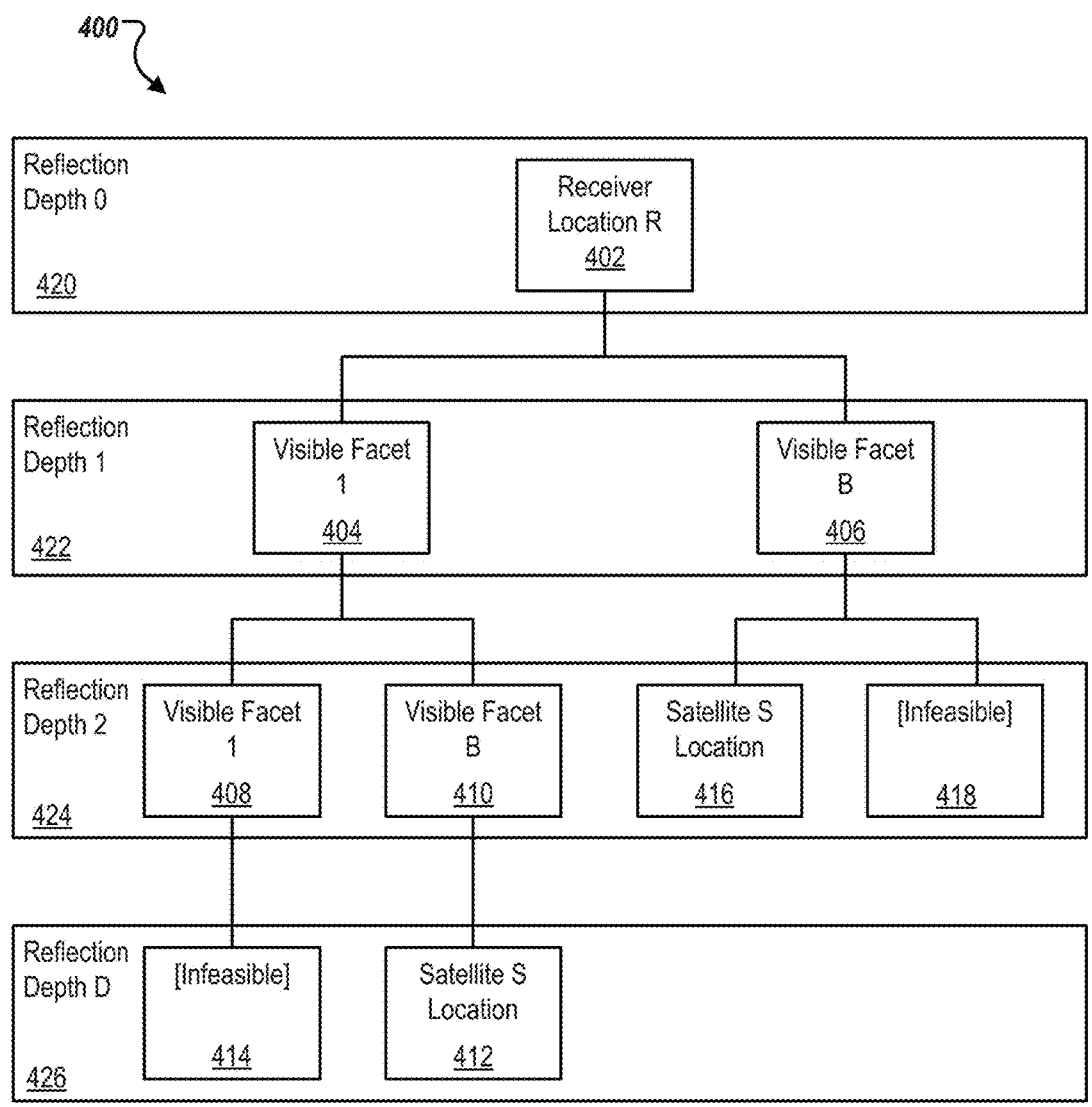
FIG. 4A is a diagram illustrating an example tree data structure for solving a multipath signal problem.

FIG. 4A is a diagram illustrating an example tree data structure 400 for solving a multipath signal problem. Processor 100 solves the following problem: given a known transmitter location, a hypothetical receiver location, finding feasible paths for a signal to travel from the transmitter location to the receiver location, or determining that no feasible path exists. There can be many facets of structures (e.g., surfaces of buildings) that may reflect the signal multiple times. Finding the feasible paths can be a NP complete problem. By using example tree data structure 400, processor 100 can use NLOS subsystem 208 to find the feasible paths efficiently and in a manner that scales.

Processor 100 can determine transmitter locations from knowledge of approximate time and transmitter ephemerides broadcast from the transmitters. Processor 100 can determine, in an initial location bound (e.g., initial location bound 120 of FIG. 1), a grid of possible receiver locations, which will be referred to as candidate receiver locations or candidate locations. Processor 100 can determine the candidate locations by computing a location solution using available transmitters, optionally adjusting the location solution using readings from other sensors, and overlay a mesh grid around that location solution according to expected errors of the location solution. Processor 100 can calculate a shortest feasible path for each tracked transmitter on the grid of possible receiver locations with associated relevant facets.

Processor 100 can iterate through the grid of candidate receiver locations and, upon determining that a transmitter/receiver location pair fails to produce a feasible solution, remove the corresponding receiver location from the grid of candidate receiver locations for the corresponding transmitters.

Processor 100 can compute a pseudorange correction $\delta_{NLOS}$ for the shortest feasible path at a given receiver location. Processor 100 can then compute running mean and variance tallies for $\delta_{NLOS}$ for all candidate locations. Upon constructing $\delta_{NLOS}$ statistics for the whole grid, processor 100 can recommend transmitters that correspond to small $\sigma_\delta$ for pseudorange corrections relative to pseudorange error. A small $\sigma_\delta$ for pseudorange corrections relative to pseudorange error can be a standard deviation that satisfies a threshold, e.g., one meter.

Processor 100 can represent each candidate receiver location as a root node in a respective tree data structure. For example, as shown in FIG. 4A, node 402 is a root node having no parent nodes. Node 402 represents location R, which is a candidate receiver location.

Node 402 can have one or more children nodes (e.g., children nodes 404 and 406). Each of children nodes 404 and 406 can represent a relevant facet. A relevant facet for a location (e.g., location R, or a location of another facet) can be a surface of a physical object that may reflect the signal to that location. For example, a relevant facet for a location can be a facet in a direct LOS at the location.

Each of children nodes 404 and 406 may have one or more children nodes. For example, node 404 may have children nodes 408 and 410. Each of children nodes 408 and 410 can represent a respective facet visible at the facet represented by node 404. The facets represented by nodes 410 and 404 can be facets on a feasible path of a signal to travel from a transmitter located at location S, as represented by leaf node 412 in tree data structure 400. The feasible path can indicate that the signal from that transmitter located at S is reflected first by the facet represented by node 410, then by the facet represented by node 404, before finally reaching the receiver located at R. In contrast, leaf node 414, which is another child node of node 404, can be an empty (e.g., null) node indicating that there is no transmitter located at a known transmitter location that can reach R by being reflected first by the facet represented by node 414 and then by the facet represented by node 404. Likewise, leaf node 416 and leaf node 418 can be children of node 416, indicating a feasible path and an infeasible path, respectively. Details of how to determine a path is feasible or infeasible are described below in reference to FIG. 5.

Tree data structure 400 can have multiple levels, for example, levels 420, 422, 424, and 426. Each level, other than level 420 that corresponds to the root node, can represent a leg of a signal path. Tree data structure 400 has a depth D, which represents numbers of legs in the signal path and corresponds to how many reflections the signal path contains.

Tree data structure 400 can have a branching factor B corresponding to number of relevant facets. An object model system can determine the relevant facets from geographic data. Details of determining relevant facets from geographic data are described below in reference to FIG. 4C. The object model system can have an interface receiving inputs from an NLOS subsystem. The interface can receive inputs including a location of interest. The location can include coordinates in ECEF in meters. The input can include a bounding shape (e.g., an ellipsoid of an initial location bound) of interest. The bounding shape can be represented in ECEF coordinates in meters.

The object model system can have an interface and produce outputs to an NLOS subsystem. The outputs can include a list of rectangles approximating facets of physical objects having any vertices inside of the bounding shape (e.g., a bounding ellipsoid). The rectangle can have corners specified in ECEF, in meters. The number of relevant facets B can be designated as a branching factor of tree data structure 400. In the examples shown, facets are rectangles. In various implementations, facets can have various geometric shapes.

Other branching factors of tree data structure 400 can include number (R) of hypothetical locations within the initial location bound, a depth of tree data structure 400 (D) corresponding to the number of signal reflections before the signal escapes, and number (S) of satellites being tracked. Tree data structure 400 can represent a total number of signal paths to be feasibility checked as P using calculation (3) below.

$$P = R * B^D * S, \quad (3)$$

where P is the total number of signal paths, R is the number of hypothetical locations, D is a depth of tree data structure 400, and S is the number of satellites tracked. Processor 100 can make the feasibility checking of tree data structure 400 workable algorithmically, by limiting the number of signal paths to be checked, or both.

To limit the number of signal paths to check, processor 100 can set limits on each of the parameters. For example, processor 100 can limit the number R of hypothetical locations to the order of $10^4$, assuming the initial location bound has an area of 100×100 square meters, and the precision to be one meter. Processor 100 can limit the number S of satellites to the order of 10, assuming no more than a few dozen satellites of the GNSS system can be observable at any given time. Processor 100 can limit the number of relevant facets to a number less than ten (e.g., six), assuming each hypothetical location is in a typical city block having three facets on one side of a street and three facets on another side.

Processor 100 can limit depth D of tree data structure 400 using calculation (4) below.

$$D \sim \frac{H}{\overline{\mu} \tan \varepsilon}, \quad (4)$$

where $\bar{H}$ is a mean building height, $\bar{\mu}$ is a mean free path between reflecting surfaces, and ε is a satellite elevation. Accordingly, for example, processor 100 can limit depth D to 1 when $\bar{H}$ is five meters (for a single story building), $\bar{\mu}$ is 20 meters (for four lanes in a street and sidewalks on both sides), and ε is 25 degrees; and processor 100 can limit depth D to 3 when $\bar{H}$ is 25 meters (for a five-story building), $\bar{\mu}$ is 20 meters (for four lanes in a street and sidewalks on both sides) and ε is 25 degrees.

Using the numbers thus limited, processor 100 can construct R number of tree data structures each similar to tree data structure 400. Processor 100 can then perform a depth-limited search with branch pruning via pre-computed visibility data and loop closure.

Figure 4B:
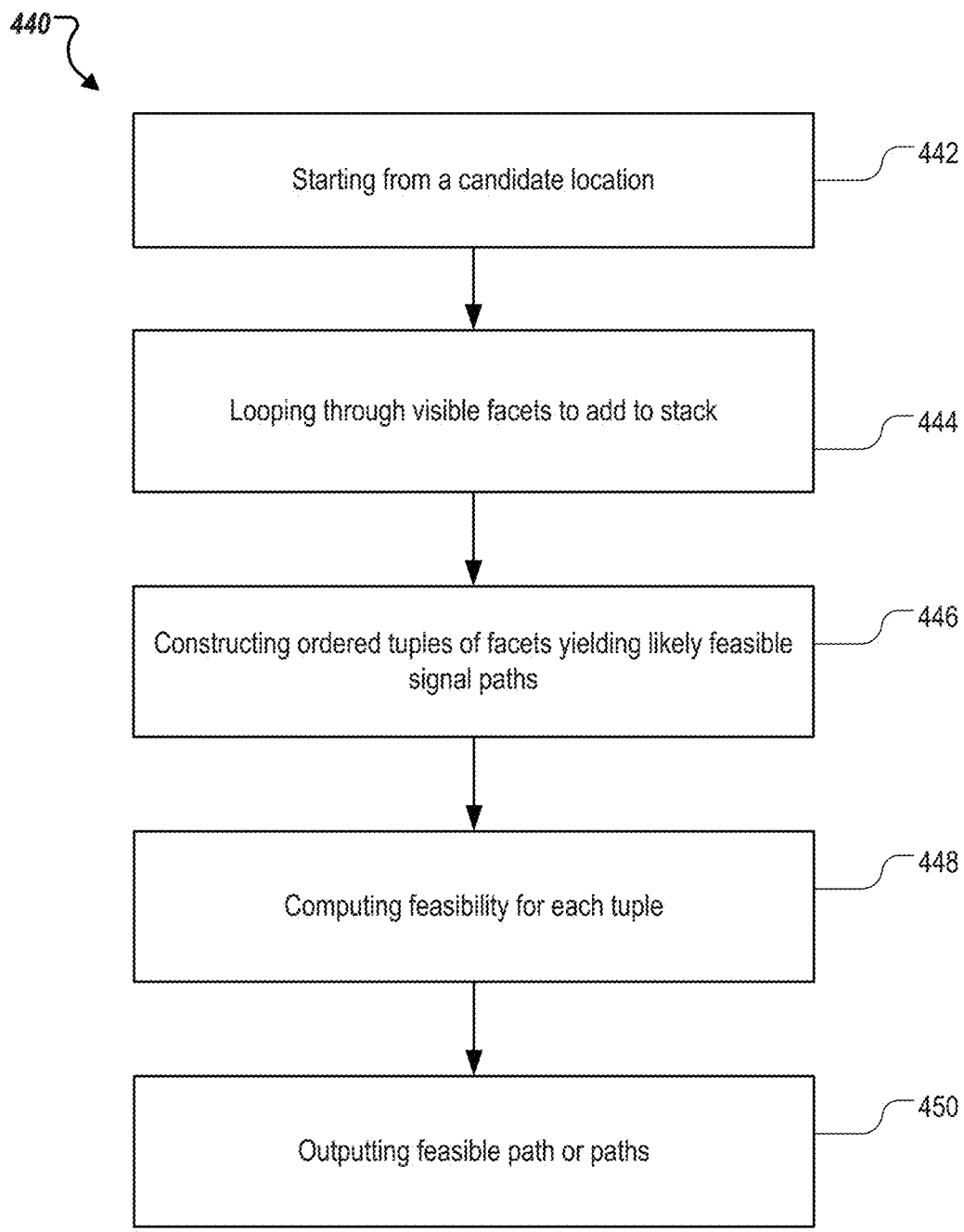
FIG. 4B is a flowchart of an example process of constructing and traversing the tree data structure.

FIG. 4B is a flowchart of example process 440 of constructing and traversing a tree data structure. The tree data structure can be tree data structure 400 of FIG. 4A. Process 440 can determine one or more feasible paths for signals to reach a receiver.

To construct and traverse tree data structure 400, processor 100 can start (442) at a corresponding receiver location. Initially, processor 100 can set path length to zero, and set a current path to empty.

The processor can loop (444) through visible and relevant facets of physical objects. The processor can determine which facets are visible at a start location by testing multiple facets. Initially, the start position can be the receiver location. Then, in the loops, the start position can become a location of a facet F1 that is visible from the receiver location, a location of a facet Fi that is visible from facet Fi−1, and so on, while there are still visible and relevant facets. The loop can have a complexity of $O(N^2)$.

In some implementations, to form a sorted list the processor can sort the counterclockwise or clockwise edges of each facet by bearing. The processor can then traverse the sorted list and store visible physical facets in a stack. The sorting can reduce the complexity of the loop to $O(N \log N)$. In some implementations, visible facets at each candidate location can be stored in a facet lookup table and delivered to the processor as a service. The lookup table can reduce the complexity to $O(1)$.

In each loop 444, the processor can determine whether a signal from the transmitter can intersect the facet at a distance of current path length plus a distance between a transmitter and the facet. Upon determining that the signal can intersect the facet, the processor can designate the facet as relevant. Upon determining that the signal clears the facet vertically instead of intersecting the facet, the processor can designate the facet as irrelevant. The processor can add visible and relevant facets to a stack for depth first search (DFS). As the DFS proceeds, the processor can keep track of current path and current path length.

The processor can construct (446) ordered tuples of facets in the DFS. Each ordered tuples of facets may yield a likely feasible path. For each ordered tuple, the processor can compute (448) feasibility of the corresponding signal path from transmitter to receiver. Computing the feasibility can include solving a top-down object view problem. The problem can be non-linear but well-behaved in neighborhoods of a feasible solution and linearizable. Solving the linear problem can include determining points at which the signal intersects each physical object. Details of computing the feasibility of a path are described below in reference to FIG. 5.

The processor can improve efficiency of the calculations by performing the computations in a top-down view of physical objects, so path feasibility computes intersection of a ray with multiple lines. The processor can sort satellites by elevation in descending order and thereby treat the more computationally expensive satellites last. The processor can interrupt the computation upon reaching a time constraint.

The processor can then output (450) a result of the computation. In some implementations, the result can include the feasible path or paths or indicate that no feasible path is available. In some implementations, the processor can compare a respective difference (ΔR) between length of each feasible path and a possible shortest path between transmitter and receiver (a straight-line distance). The processor can determine a weighted average of all ΔRs to determine a probability that the receiver is at each candidate location to determine a recommended range correction and a probability of the correction.

Figure 4C:
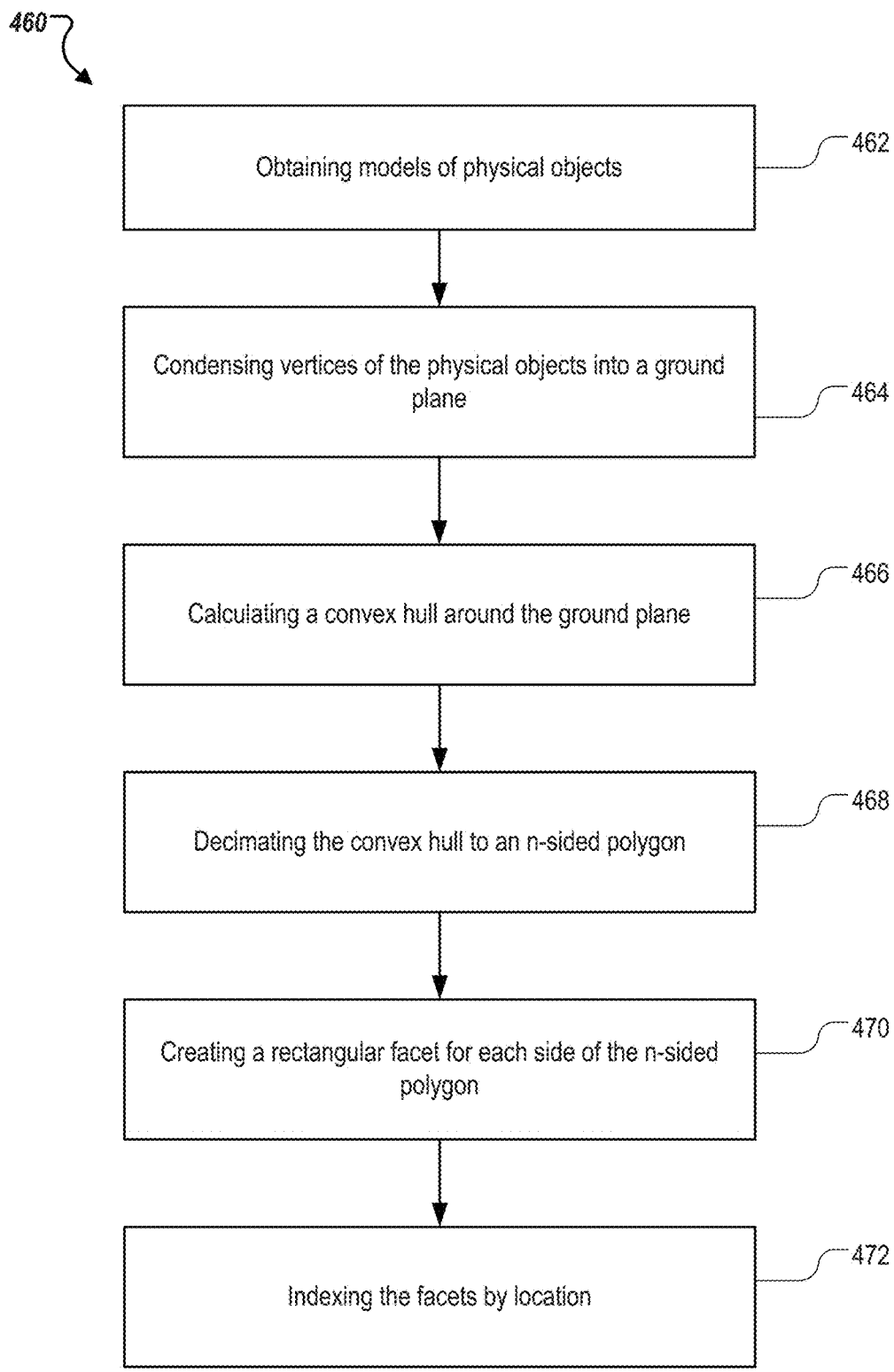
FIG. 4C is a flowchart of an example process of determining facet data.

FIG. 4C is a flowchart of example process 460 of determining facet data. Process 460 can be performed by an object model system. The object model system can be a separate system including one or more computers or a subsystem of processor 100 or a combination of both. The object model system can generate representations of the facets using models of physical objects as stored in object model store.

The object model system can obtain (462), from the geographic data, 3D models of physical objects that are located within a configurable radius of a receiver location or a signal bounce. The physical objects can include structures (e.g., buildings, bridges or billboards) or natural features (e.g., cliffs). The 3D models can include building models specifying location, geometry and structure of buildings. The 3D models can include vertices of the physical objects. The object model system can obtain the geographic date from the object model store.

The object model system can condense (464) the vertices into the facets by collapsing the vertices into a ground plane. The object model system can calculate (466) a convex hull around the ground plane. The object model system can decimate (468) the convex hull to an n-sided polygon having less than a threshold number (e.g., 10) of sides. The object model system can then create (470) a rectangular facet for each side of the polygon. The object model system can assign a length of the side to be the base of the rectangle. The object model system can assign a height of the rectangle to be the height of the physical object. The object model system can store information about the facets as facet data in a facet database. The information can include, for example, location, size and orientation of each facet.

The object model system can index (472) the facets by location to create a facet lookup table. Upon receiving a query indicating a given location, the object model system can return facets that are visible (e.g., are in line-of-sight) at the given location. Upon receiving a query indicating a given region (e.g., an initial location bound), the object model system can return facets that are visible at each candidate location inside the given region.

In some implementations, the object model system can determine the facet data can use actual polygons instead of using convex hull approximations. For a first example, example, the object model system can flatten building vertices to the ground, create n-sided polygons from flattened building vertices with no restriction on number of sides n or convexity. The object model system can then create planes from those flattened building vertices at a constant height of the building. Finally, the object model system can use computational geometry to determine if any portion of each facet is visible from each location in the lookup table.

For a second example, the object mode system can flatten building vertices to the ground, create n-side polygons and then create planes with a specific starting and ending heights. The object model system can then use computational geometry to determine if any portion of each facet is visible from each location in the lookup table.

For a third example, the object model system can flatten building vertices to the ground, create n-sided polygons and then create planes with specific starting and ending heights. The object model system can then use ray tracing and triangulation to generate a set of visible sub-facets that store the actual visible portions of each building from each location in the lookup table. Each of the first, second and third example is an implementation that successively improves the correctness and reduces the approximation of the visible facet lookup table.

Figure 5:
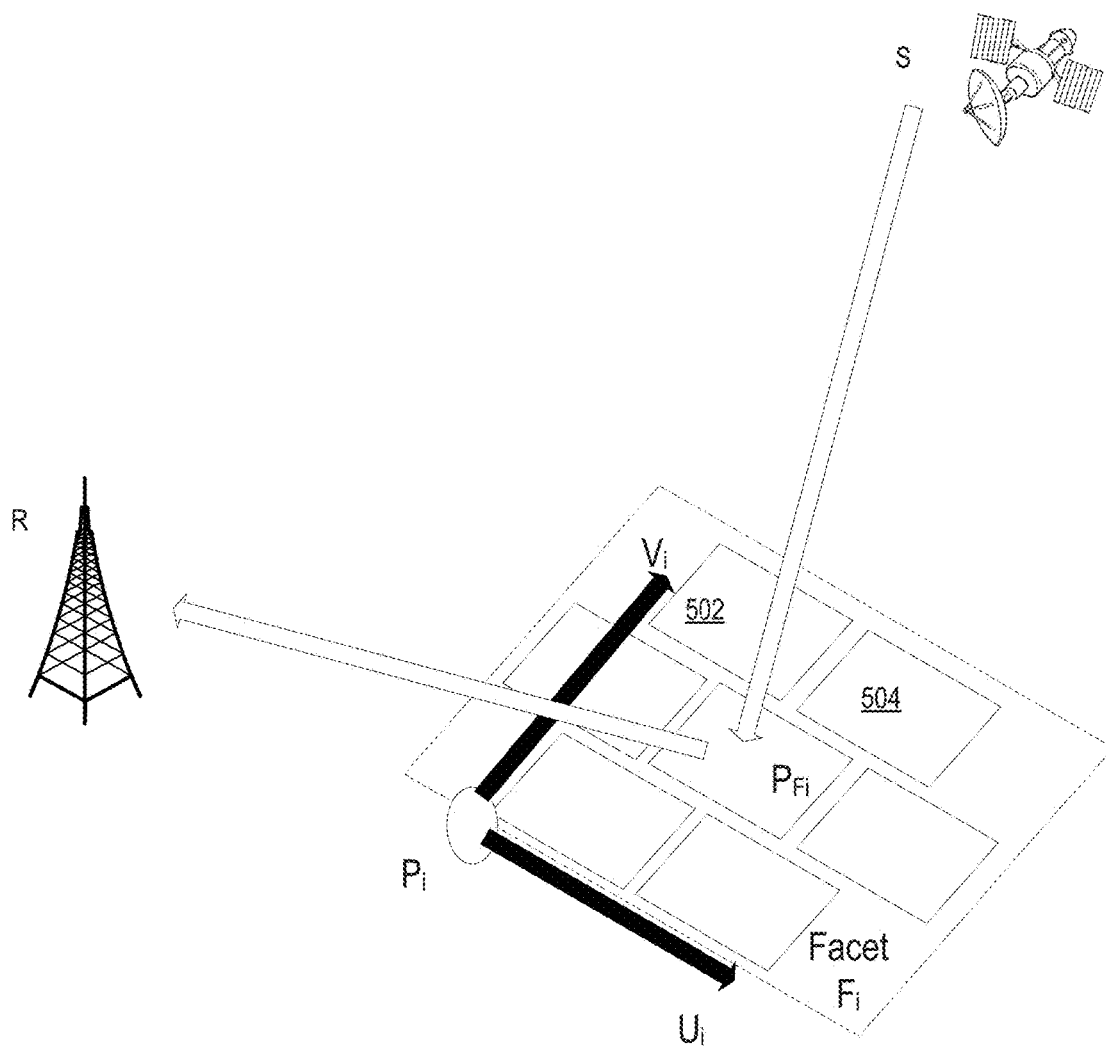
FIG. 5 is a diagram illustrating feasibility checking techniques for parsing a tree data structure.

FIG. 5 is a diagram illustrating feasibility checking techniques for parsing a tree data structure. Processor 100 (of FIG. 1) can perform a feasibility check described in reference to FIG. 4 in various ways. For example, the processor can perform a reflection feasibility check or an azimuth feasibility or both, as described below.

In some implementations, processor 100 can perform the reflection feasibility check for a path in a tree corresponding to a candidate location R by calculating whether it is feasible for a signal from satellite location S to hit each facet $F_1$, $F_2$, ... $F_n$ in the path, reflects from one facet to the next facet until the signal reaches a receiver location R. In the example of FIG. 5, a facet Fi is shown. Facet Fi can be an i-th facet in the path. Facet Fi can include multiple portions (e.g., tiles 502 and 504, located at various places on facet Fi) that can reflect an RF signal.

Processor 100 can determine whether that path is feasible by solving the following system of equations for $w_{u_i}$ and $w_{v_i}$.

$$\frac{P_{i+1} + w_{u_{i+1}} u_{i+1} + w_{v_{i+1}} v_{i+1} - P_i - w_{u_i} u_i - w_{v_i} v_i}{\|P_{i+1} + w_{u_{i+1}} u_{i+1} + w_{v_{i+1}} v_{i+1} - P_i - w_{u_i} u_i - w_{v_i} v_i\|} \cdot n_i = \tag{5.1}$$
$$-\frac{P_i + w_{u_i} u_i + w_{v_i} v_i - P_{i-1} - w_{u_{i-1}} u_{i-1} - w_{v_{i-1}} v_{i-1}}{\|P_i + w_{u_i} u_i + w_{v_i} v_i - P_{i-1} - w_{u_{i-1}} u_{i-1} - w_{v_{i-1}} v_{i-1}\|} \cdot n_i,$$

$$\frac{P_{i+1} + w_{u_{i+1}} u_{i+1} + w_{v_{i+1}} v_{i+1} - P_i - w_{u_i} u_i - w_{v_i} v_i}{\|P_{i+1} + w_{u_{i+1}} u_{i+1} + w_{v_{i+1}} v_{i+1} - P_i - w_{u_i} u_i - w_{v_i} v_i\|} \cdot d_i = \tag{5.2}$$
$$-\frac{P_i + w_{u_i} u_i + w_{v_i} v_i - P_{i-1} - w_{u_{i-1}} u_{i-1} - w_{v_{i-1}} v_{i-1}}{\|P_i + w_{u_i} u_i + w_{v_i} v_i - P_{i-1} - w_{u_{i-1}} u_{i-1} - w_{v_{i-1}} v_{i-1}\|} \cdot d_i,$$

where S is a location of a satellite in the tree, R is a location of the receiver corresponding to the tree, Fi is an i-th facet in the path, i=1, 2, . . . n corresponding to facets, 1 representing the first facet from the transmitter, n being number of facets in a path. Pi is a location of an anchor point on facet Fi, $P_{F_i}$ is a location that the signal from S (or from a facet $F_{i-1}$) hits facet Fi. Vectors $v_i$ and $u_i$ are unit vectors that define the orientation of facet Fi, $w_{u_i}$ and $w_{v_i}$ are weights of the unit vectors. The weights can give projection of the vector $P_{F_i} - P_{F_{i-1}}$ on to each of $v_i$ and $u_i$, respectively. Ni can be a unit vector that is normal to the plane of the i-th facet. Ni can be calculated from, for example, the cross product of $u_i$ and $v_i$. Ni can then normalized to a unit vector.

Di can be a unit vector that lies in the plane of the i-th facet. Di can be perpendicular to the inbound and outbound signal directions. It can be calculated, for example, from the cross product of $r_{F_{i+1}} - r_{F_{i-1}}$ and $n_i$. Di can then be normalized to a unit vector. In the cross product, $r_{F_{i+1}}$ and $r_{F_{i-1}}$ are reflection points on the respective facets. In some implementations, processor 100 can generate an initial guess of $d_i$ assuming the transmitter is far away and using basic laws of perfect reflection (angle of incidence=angle of reflection) to calculate inbound and outbound signal directions. The initial guess is then perpendicular to those directions and also perpendicular to $n_i$. Each of the locations R, S, and Pi can be represented using Cartesian coordinates in a three-dimensional system (e.g., ECEF or latitude, longitude, and altitude). Processor 100 can designate a path to be feasible when each $P_{F_i}$ is in the boundaries of a physical object.

In some implementations, processor 100 can perform a fast azimuth feasibility check. Processor 100 can compute a sum of azimuths a of each of N segments in a signal path including N−1 reflections, assuming angle of incidence is the angle of reflection. Each segment can be a straight portion of the signal path between a source and a reflection point, between two consecutive reflection points or between a reflection point and an antenna. A path is feasible if a difference between the sum and an azimuth of a transmitter of the signal is smaller than a threshold value, or infeasible otherwise. Processor 100 can perform the azimuth feasibility check by using calculation (6) below to calculate the difference.

$$\alpha = \sum_{i=1}^{n} \alpha_i - \alpha_S, \tag{6}$$

where α is the sum, N is the total number of segments in a path, $\alpha_i$ is an azimuth of the i-th reflection, $\alpha_S$ is an azimuth of the transmitter location in the path.

Figure 6:
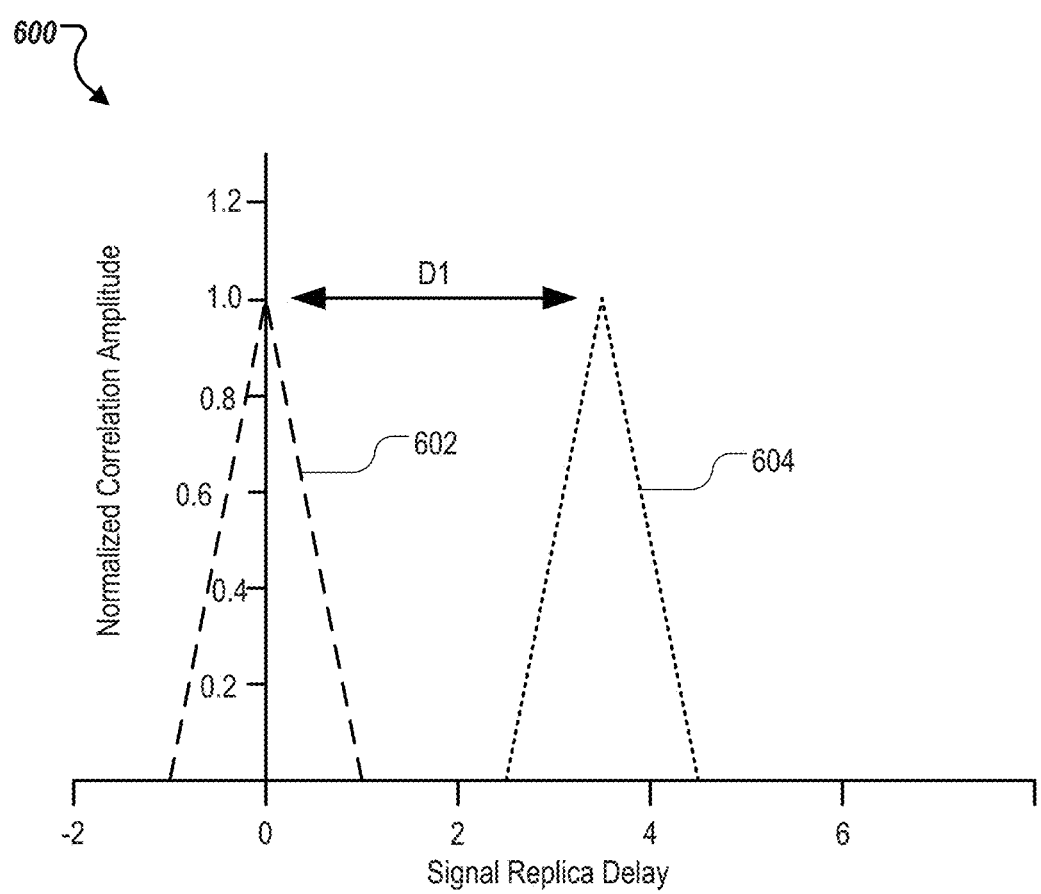
FIG. 6 is an example correlation graph illustrating delay of a multipath signal.

FIG. 6 is an example correlation graph illustrating delay of a multipath signal. A receiver may detect and/or track a signal by correlating a sample of received RF data with a receiver-generated replica of the signal at various time delays. The receiver may try to track the peak of a correlation curve represented in correlation graph 600. An x-axis of correlation graph 600 can represent normalized signal replica delay. A y-axis of correlation graph 600 can represent normalized correlation amplitude. Correlation curve 602 represents a signal traveling from transmitter to receiver through a first path. Correlation curve 604 represents the signal traveling from the transmitter to the receiver through a second path that is longer than the first path. A time delay D1 between respective peaks of correlation curves 602 and 604 can result from a difference in lengths between the first path and the second path. The receiver may track the peak of the earlier curve, which is correlation curve 602 in this example.

A processor (e.g., processor 100) can determine the length of time delay D1 by comparing the difference between feasible paths determined from tree data structure 400. The processor can determine a shortest feasible path and determine respective differences between other feasible paths and the shortest feasible path. The processor can then calculate a respective time delay D1 for each feasible path.

Figure 7:
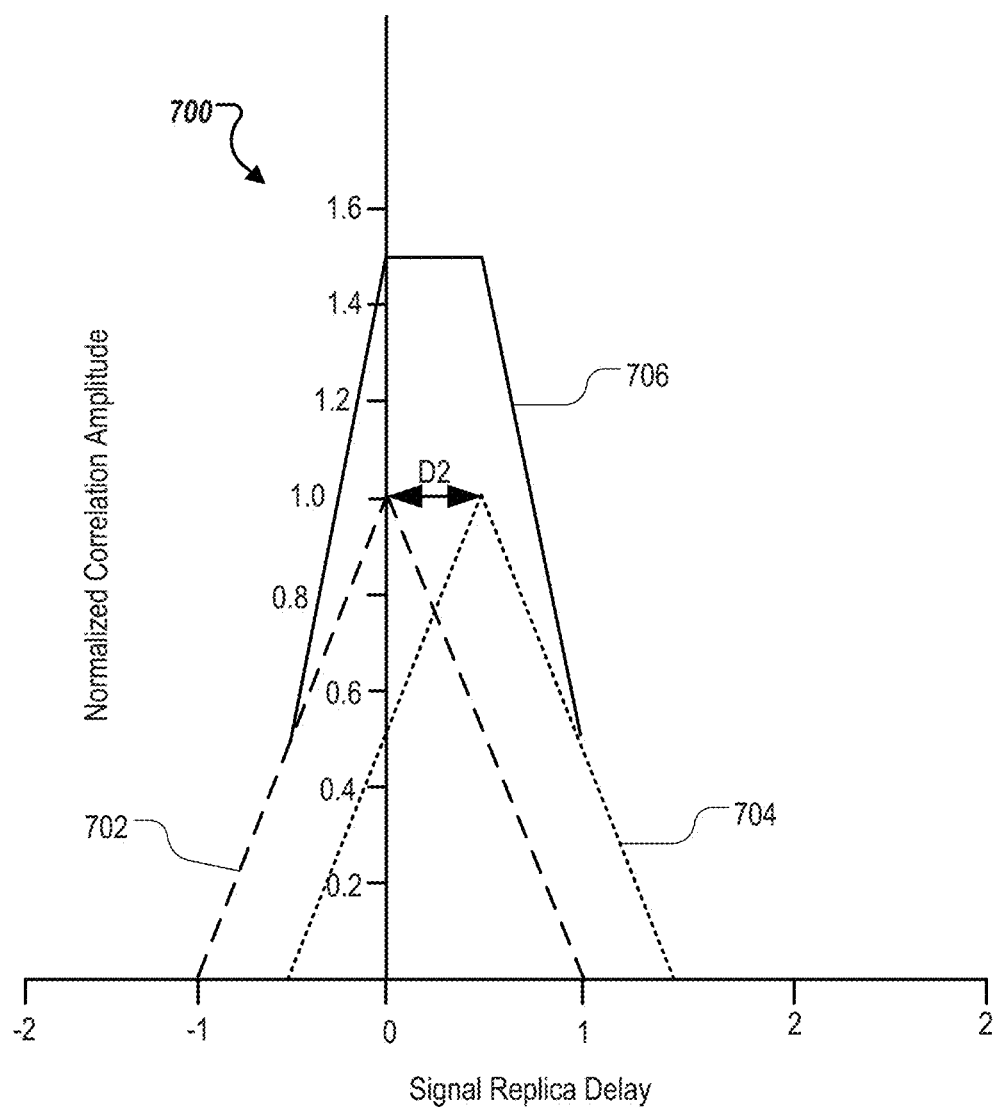
FIG. 7 is an example correlation graph for distinguishing multipath signals having small differences.

FIG. 7 is an example correlation graph for distinguishing multipath signals having small differences. In correlation graph 700, correlation curve 702 represents a signal arriving from a transmitter to a receiver along a first signal path. Correlation curve 704 represents the signal arriving from the transmitter to a receiver along a second, longer signal path. The difference in lengths between the first signal path and second signal path is small enough to cause the signals from the first path and second path to interfere with each other. For example, a time delay D2 between the peaks of the correlation curves 702 and 704 causes correlation curves 702 and 704 to add to one another to form correlation curve 706. A receiver tracking the peak of combined signals may report an incorrect signal delay. The receiver may report a signal delay that is a function of the two signal paths.

The receiver may sample a correlation curve at a small number signal delays, also referred to as taps. The receiver may sample at an early tap E and a late tap L that is separate from the early tap E by a time delay d. A receiver may track a signal via feedback control, adjusting the delay of its replica according to a receiver-based estimate of the delay. Correlation curves can include a sum of power over multiple samples. A receiver may report a pseudorange using calculation (7) below.

$$\rho = c \cdot \text{delay}, \qquad (7)$$

where $\rho$ is the pseudorange and c is the speed of light. If the delay is reported incorrectly due to multipath, the pseudorange may be in error.

A processor (e.g., processor 100) may correct this error by determining a difference in path length and removing the delay caused by the difference in path length. For example, as shown in FIG. 7, the processor can determine a length of the first signal path for correlation curve 702 by identifying a shortest feasible path in a tree data structure. The processor can determine the length of the second signal path for correlation curve 704 by identifying another feasible signal path for correlation curve 704. The processor can then remove the interference of the signal traveling along the second path from correlation curve 706.

A processor can determine each feasible path from a transmitter to a receiver by traversing a tree data structure (e.g., tree data structure 400 of FIG. 4). The processor can determine whether any of the feasible paths are close enough in distance to interfere with each other. In some implementations, the processor can sort path lengths on distance to identify signal paths with fewer reflections and consequently, lower delays.

The processor can construct a correlation curve for paths that are close enough to interfere. The processor can construct the correlation curve based on the sum of the interfering paths using the difference in path lengths. The processor can use the correlation curve and the fact that a receiver may set delay $\propto E^2 - L^2$ to determine the delay that the receiver may report. The processor can use prior estimate, external estimate, or a priori estimate of receiver and transmitter location to determine shift correction to $\delta_{NLOS}$ to correct a direct line of sight pseudorange $\rho$ to account for delay due to multipath.

Figure 8:
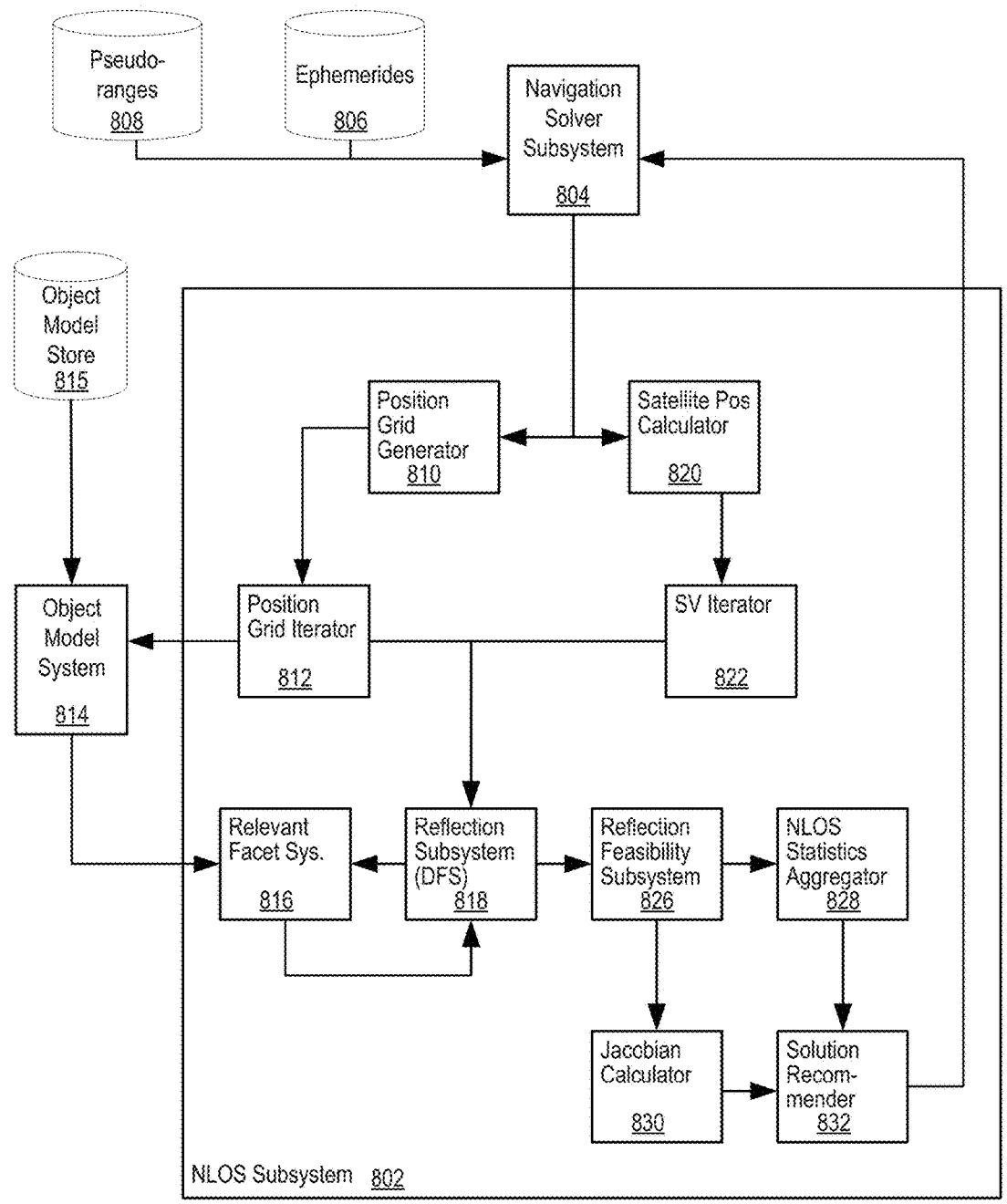
FIG. 8 is a block diagram illustrating components of an example processor configured to perform the operations of positioning using NLOS signals.

FIG. 8 is a block diagram illustrating components of example processor 100 configured to perform the operations of positioning using NLOS signals. Each component of processor 100 can include hardware, software, firmware, or any combination of the above.

Processor 100 can include NLOS subsystem 802 and location solver subsystem 804. NLOS subsystem 802 is a component of the processor configured to receive a location solution, determine a solution recommendation and provide the solution recommendation to location solver subsystem 804 for correcting the location solution in a next iteration.

Location solver subsystem 804 is a component of the processor configured to obtain ephemerides 806 of one or more GNSS satellites and respective pseudoranges 808 to those GNSS satellites. Location solver subsystem 804 can then generate a location solution from the ephemerides 806 and pseudoranges 808. Location solver subsystem 804 can adjust the location solution using the solution recommendation and provide the adjusted location solution to various programs, for example, for display or for acquiring location based services.

NLOS subsystem 802 can include position grid generator 810. Position grid generator 810 is a component of NLOS subsystem 802 configured to generate one or more candidate locations of an antenna coupled to the processor. The candidate locations can be a grid of locations within an initial location bound defined by the location solution received from location solver subsystem 804 and an error margin.

NLOS subsystem 802 can include test position grid iterator 812. Test position grid iterator 812 is a component of NLOS subsystem 802 configured to iterate through each candidate location provided by position grid generator 810. Position grid iterator 812 can request, for each candidate location, a set of facets from object model system 814. Object model system 814 can be a component of processor 100, or an independent system coupled to processor 100, that is configured to provide one or more facets for each given location provided by test position grid iterator 812. Object model system 814 can perform operations described in reference to FIG. 4C using data stored in object model store 815. Object model store 815 can store geographic data of physical objects received from a map service.

Position grid iterator 812 can provide each candidate location to reflection subsystem 818. Reflection subsystem 818 is a component of NLOS subsystem 802 configured to generate, traverse and prune a tree data structure for each location received from position grid iterator 812. For each location, reflection subsystem 818 can request relevant facet system 816 to provide one or more facets. Relevant facet system 816 can determine visible and relevant facet for the location based on facets obtained from object model system 814.

Reflection subsystem 818 can build the tree data structure using the relevant facets and satellite information. Satellite position calculator 820 can provide the satellite information. Satellite position calculator 820 is a component of NLOS subsystem 802 configured to determine a respective location for each GNSS satellite observed using ephemerides broadcast from each GNSS satellite. NLOS subsystem 802 can include space vehicle (SV) iterator 822. SV iterator 822 is a component of NLOS subsystem 802 configured to iterator through satellite positions provided by satellite position calculator 820 and provide each satellite position to reflection subsystem 818 for building the tree data structure. Reflection subsystem 818 can represent each satellite position as a respective set of leaf nodes in the tree date structure.

Reflection subsystem 818 can iterate through the tree data structure in a depth first search. For each path that is likely to be a feasible path (e.g., a path that does not have more than a threshold number of reflections), reflection subsystem 818 can provide the path to reflection feasibility subsystem 826 to determine whether that path is a feasible path. Reflection feasibility subsystem 826 is a component of NLOS subsystem 802 configured to determine whether a path is feasible, including performing the operations described in reference to FIG. 5.

Reflection feasibility subsystem 826 can provide one or more feasible signal paths to NLOS statistics aggregator 828 and Jacobian calculator 830. NLOS statistics aggregator 828 is a component of NLOS subsystem 802 configured to determine satellites that are statistically stable across candidate locations based on feasible paths provided by NLOS reflection feasibility subsystem 826. NLOS statistics aggregator 828 can provide a list of the statistically stable satellites to solution recommender 832.

Jacobian calculator 830 is a component of NLOS subsystem 802 configured to determine a list of sigmas $\sigma_\delta$ for pseudorange corrections $\delta_{NLOS}$, and a list of range correction Jacobians $$\frac{\partial \delta_{NLOS}}{\partial *}.$$

Jacobian calculator 830 can provide the range correction Jacobians to solution recommender 832.

Solution recommender 832 is a component of NLOS subsystem 802 configured to communicate with location solver subsystem 804 and provide a solution recommendation to location solver subsystem 804. The solution recommendation can include a list of the stable satellites for use in a next iteration of location solution. The solution recommendation can include the Jacobians for correcting pseudoranges in calculating the location solution.

Exemplary Procedures

Figure 9:
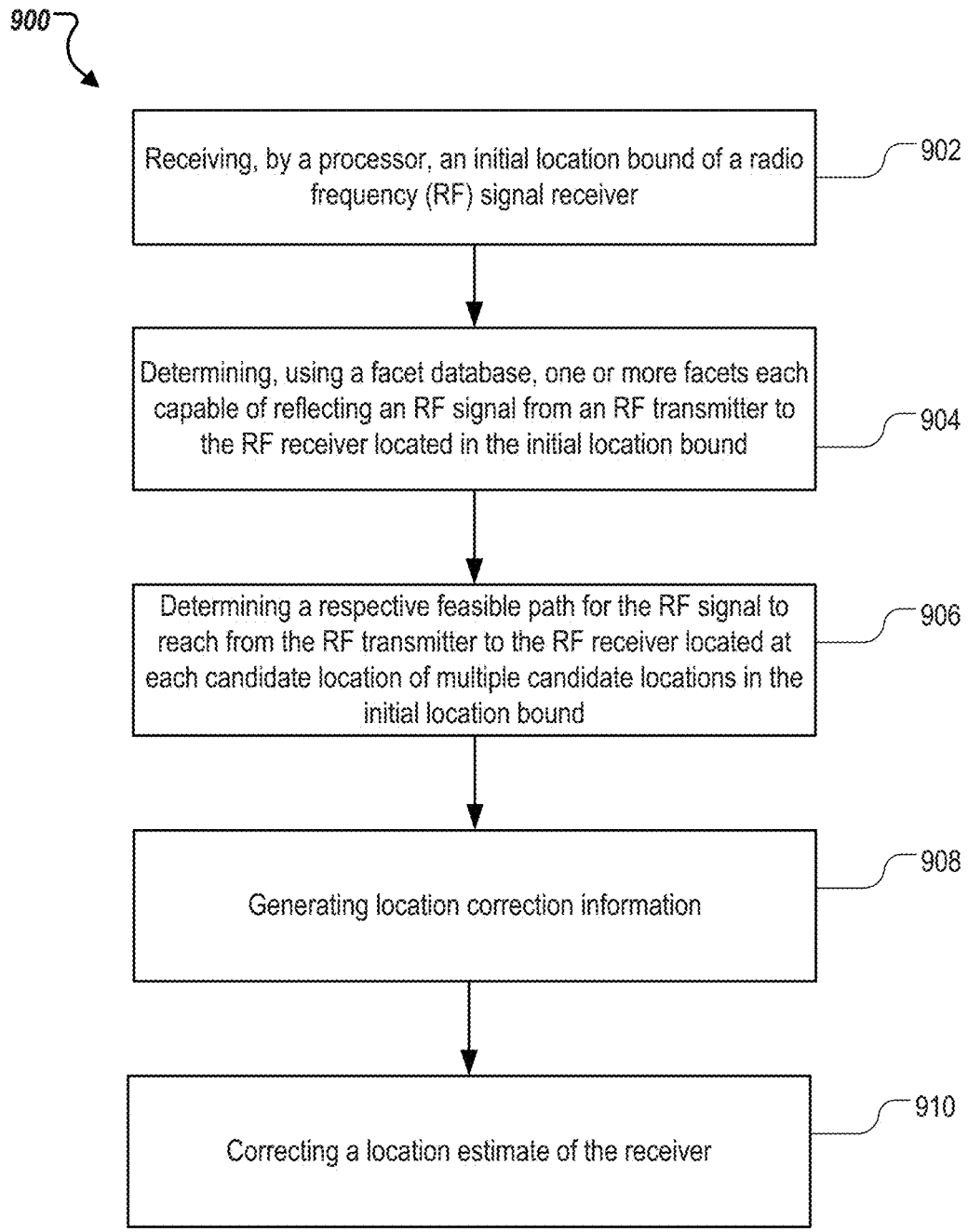
FIG. 9 is a flowchart of an example process of correcting location solution based on NLOS signals.

FIG. 9 is a flowchart of an example process 900 of correcting interference in NLOS signals. Process 900 can be performed by a processor configured to process GNSS signals (e.g., processor 100 of FIG. 1).

The processor can receive (902) an initial location bound of an RF receiver. The RF receiver can include an antenna configured to receive the GNSS signals. The initial location bound can be an initially estimated location of the receiver determined using GNSS signals. In some implementations, the initial location bound can be determined using various combinations of GNSS signals, motion sensor data, magnetometer data, Wi-Fi™ data, cellular data or user input data. The user input data can include, for example, user check-in data or map destination data.

The processor can determine (904), using a facet database, one or more facets each capable of reflecting an RF signal from an RF transmitter to the RF receiver located in the initial location bound directly or indirectly. Each facet can correspond to a reflective surface of a physical object. The processor can obtain the facets from an object model system using a lookup table. An object model system can generate the lookup table from an object model store using techniques described in reference to FIG. 4C.

The processor can determine (906) a respective feasible path for the RF signal to reach from the RF transmitter to the RF receiver located at each candidate location of multiple candidate locations in the initial location bound. Determining each feasible path can include determining that a signal can reach from the RF transmitter to the respective candidate location through one or more reflections of the one or more facets, given constraints including a respective location, size and orientation of each facet as stored in the facet database.

Determining each feasible path can include constructing and pruning a tree data structure. The tree data structure can represent multiple candidate signal paths. The processor can construct a respective tree data structure for each candidate location. Each tree data structure can have a respective root node and multiple branches. Each root node can represent the corresponding candidate location. Each of the branches can represent a candidate signal path. Each candidate signal path represents a path for a GNSS signal to reach the receiver from the transmitter through one or more reflections by one or more facets represented as nodes in the respective branch. Each candidate signal path may or may not be feasible.

At least one branch of the tree data structure includes a first non-leaf node that is a child node of the root node, an optional second node that is a child node of the first node, and a leaf node. The first node can represent a first facet visible at the candidate location corresponding to the tree containing the branch. The optional second node can represent an optional second facet that is visible at the first facet. The leaf node can represent a transmitter location. The branch thus can represent a candidate signal path through which the signal reaches from the transmitter located at the transmitter location (leaf) through reflections of the second facet (second node) and then first facet (first node) to the receiver located at the candidate receiver location (root).

A depth of the tree structure represents a number of levels of the tree data structure. Each level can represent a reflection of the RF signal. The processor can determine the depth based on a mean height of a physical object, a mean free area between facets and an estimated satellite elevation (e.g., by using calculation (4) as described above). A higher mean height of the physical object can correspond to a greater depth. A smaller mean free area can correspond to a greater depth. A higher satellite elevation corresponds to a greater depth.

The processor can prune the tree data structure by a depth-limited search of the tree data structure. The processor can perform a feasibility check for each branch of the tree data structure in the depth-limited search. The processor can remove infeasible signal paths until, according to the feasibility check, a signal path represented by a branch is determined to be feasible. Performing the feasibility checks can include performing an azimuth feasibility check. In the azimuth feasibility check, the processor can determine that a candidate signal path is infeasible upon determining a sum of azimuths of segments in the signal path deviates from an azimuth of the transmitter transmitting the signal by more than a threshold amount.

The processor can generate (908) location correction information for the RF transmitter based on one or more reflections of the RF signal. The location correction information can include a list of recommended RF transmitters for use in location determination. The location correction recommendation can include signal correction information based on the one or more reflections on the signals from each listed transmitter. The processor can provide the location correction information to the receiver as a location correction recommendation.

The processor can determine (910) a location of the receiver based on the recommendation provided in step 908 using the RF transmitter in the list as provided in the recommendation. Determining the location can include incorporating the signal correction information in calculating the location.

Figure 10A:
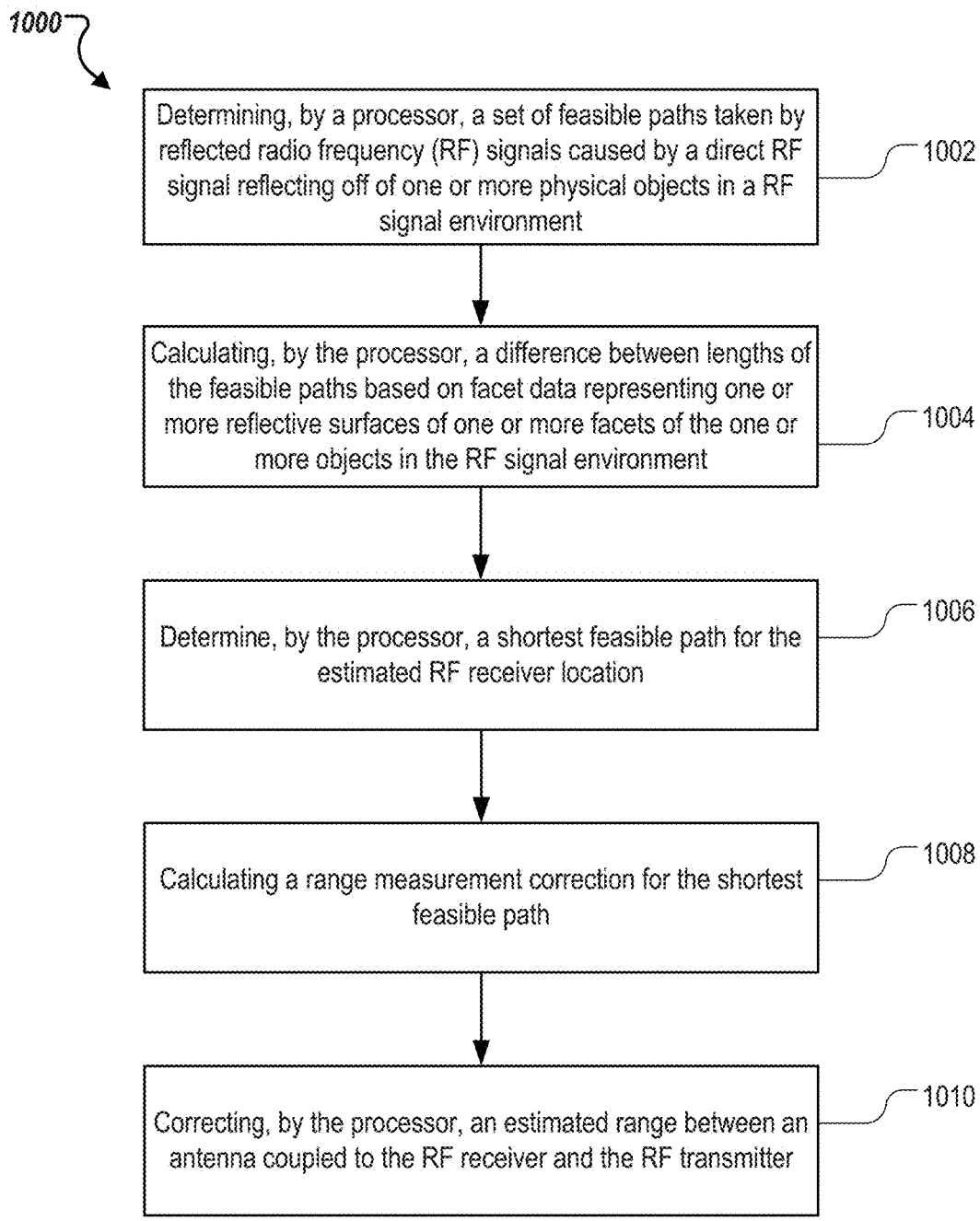
FIG. 10A is a flowchart of an example process of correcting interference in NLOS signals.

FIG. 10A is a flowchart of example process 1000 of correcting interference in NLOS signals. Process 1000 can be performed by a processor configured to process GNSS signals (e.g., processor 100).

The processor can determine (1002) a set of feasible paths taken by reflected RF signals caused by a direct RF signal reflecting off of one or more physical objects in an RF signal environment. The feasible paths can be determined at an estimated location of an RF receiver. The direct RF signal can be transmitted by an RF transmitter located remotely from the RF receiver. The RF receiver can be a GNSS receiver coupled to, or including, an antenna. The RF transmitter can include a transmitter of a GNSS satellite. Additional details of determining the set of feasible paths are described in reference to FIG. 10B.

The processor can calculate (1004) a difference between lengths of the feasible paths based on facet data representing one or more facets of the one or more objects in the RF signal environment. Calculating the difference can include calculating a respective length for each feasible path using a respective location and orientation of each facet, a candidate location of the RF receiver and a location of the RF transmitter. The location and orientation can be stored as facet data in a facet database. The facet data can include a lookup table on facets visible from each location. An object model system can determine the lookup table by performing the actions described in reference to FIG. 4C. The facet data being used can include facets located outside of the initial location bound, because signal paths can include reflection points outside of the initial location bound. The facet data being used can include data covering an area encompassing a substantial portion of possible reflection surfaces around a user The processor can determine (1006) a shortest feasible path for the estimated RF receiver location. Determining the shortest feasible path can include comparing each feasible path determined in step 1002 and identifying the shortest path.

The processor can calculate (1008) a range measurement correction for the shortest feasible path. Calculating the range measurement correction can include calculating a delay caused by the difference in lengths between a feasible signal path and the shortest feasible path.

The processor can correct (1010) an estimated range between an antenna coupled to the RF receiver and the RF transmitter using the range measurement correction. Correcting the estimated range can include removing effects caused by the delay from range estimation.

Figure 10B:
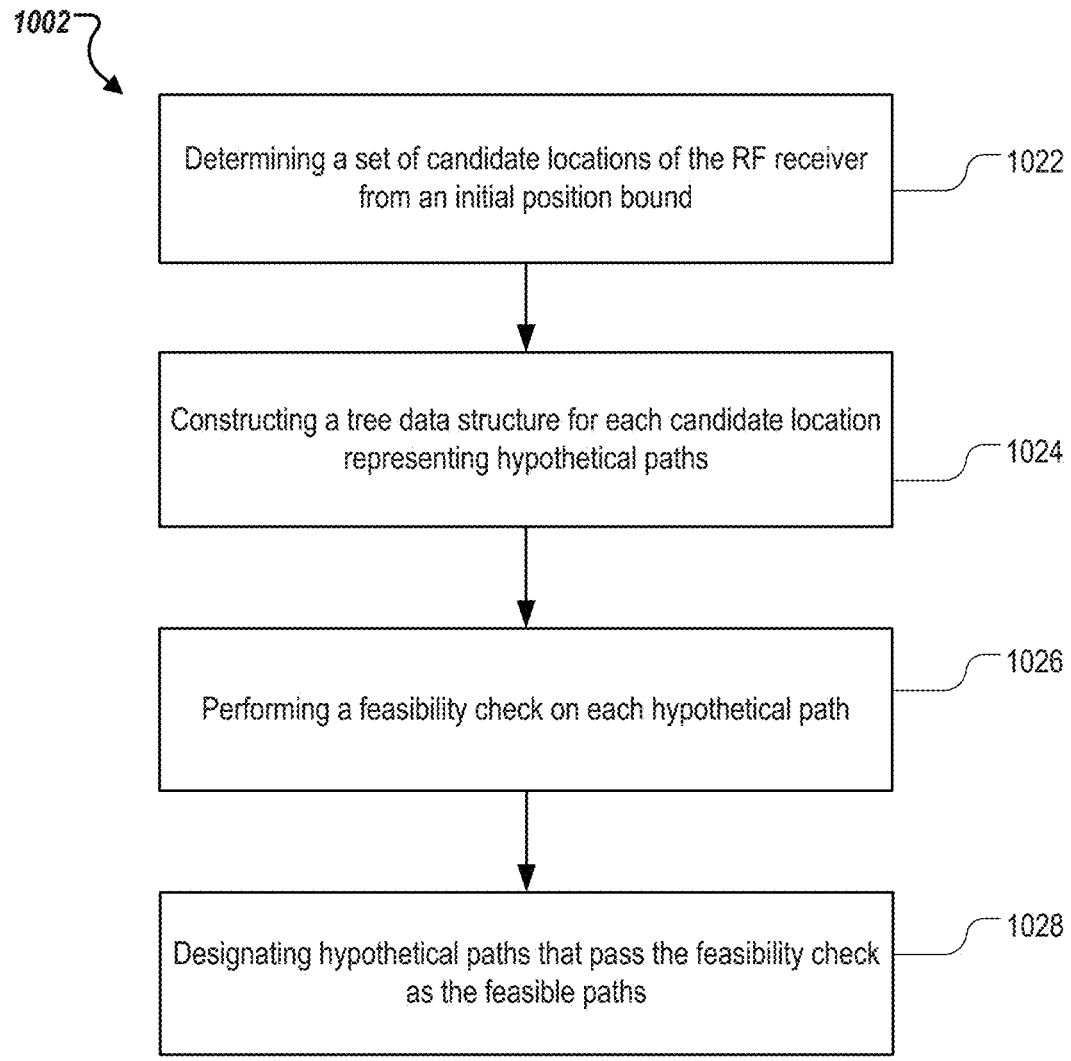
FIG. 10B is a flowchart of an example process of determining feasible signal paths.

FIG. 10B is a flowchart of an example process 1002 of determining feasible signal paths. Process 1000 can be performed by a processor configured to process GNSS signals (e.g., processor 100).

The processor can determine (1022) a set of candidate locations of an RF receiver from an initial location bound. The initial location bound includes an initially estimated location and error margin of the antenna determined using at least one of GNSS signals, motion sensor data, magnetometer data, Wi-Fi™ data, or cellular data. The candidate locations can be locations on a virtual grid inside the error margin of the initial location bound. For example, the initial location bound can be an ellipsoid of m×n meters. The virtual grid can be a grid of candidate locations one meter apart from each other.

The processor can construct (1024) a respective tree data structure for each candidate location. Each tree data structure can represent multiple hypothetical paths for the signal to reach from a location of the RF transmitter to the hypothetical location of the RF receiver. Constructing each tree data structure can include performing the following actions.

The processor can represent the candidate location corresponding to the tree data structure as a root node of the tree data structure. The processor can determine, from the facet data, one or more facets visible at the candidate location. Each of the one or more facets corresponding to a reflective surface of a physical object (e.g., a building). The processor can represent the one or more visible facets as children nodes of the root node. Each child node (C) can have its own children nodes representing facets visible at a location of the facet represented by node C. The processor can represent a location of the RF transmitter as at least one leaf node of the tree data structure. Each path from a leaf node to the root node can represent a hypothetical signal path.

A depth of the tree structure can correspond to a maximum number of reflections of the signal to be considered. The processor can determine the depth based on a mean height of a physical object, a mean free area between facets, and an estimated satellite elevation (e.g., by using calculation (4) as described above). A higher mean height of the physical object can correspond to a greater depth. A smaller mean free area can correspond to a greater depth. A higher satellite elevation corresponds to a greater depth.

The processor can perform (1026) feasibility check on each hypothetical path represented in the tree data structure. Performing the feasibility check can include performing a reflection feasibility check or azimuth feasibility check or both, as described in reference to FIG. 5. The processor can designate (1028) the hypothetical paths that pass the feasibility check as the feasible paths.

Figure 10C:
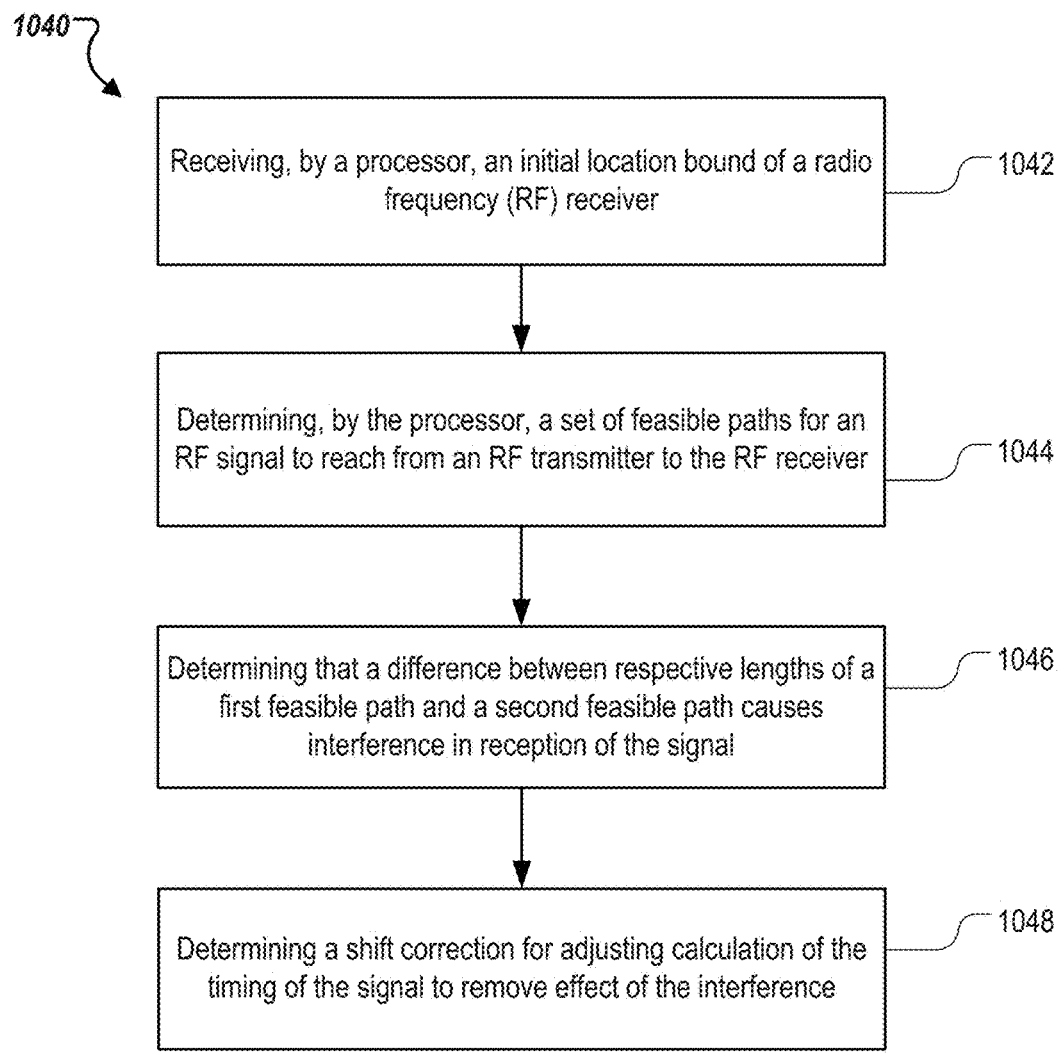
FIG. 10C is a flowchart of an example process of correcting a time shift.

FIG. 10C is a flowchart of an example process 1040 of correcting a time shift. Process 1040 can be performed by a processor configured to process GNSS signals (e.g., processor 100).

The processor can receive (1042) an initial location bound of an RF receiver. The initial location bound (e.g., initial location bound 140) can include multiple candidate location of the RF receiver. The RF receiver can include an antenna (e.g., antenna 102) configured to receive the GNSS signals. The initial location bound can be determined using at least one of GNSS signals, motion sensor data, magnetometer data, Wi-Fi™ data, cellular data or user input data.

The processor can determine (1044) a respective set of feasible paths for an RF signal to reach from an RF transmitter to the RF receiver at each of the candidate locations. The RF transmitter can include a transmitter of a GNSS satellite. The set of feasible paths can include different paths of the signal caused by the signal reflecting off different surfaces of physical objects. The surfaces can be represented as facets.

To determine the set of feasible paths, the processor can construct a respective tree data structure for each candidate location. Each tree data structure representing a plurality of hypothetical paths for the signal to reach from a location of the RF transmitter to the candidate location of the RF receiver. The processor can construct the tree data structure using techniques described above in reference to stage 1024 of FIG. 10B. The processor can perform a feasibility check on each hypothetical path represented in the tree data structure. Examples of feasibility check are described above in reference to FIG. 5. The processor can designate hypothetical paths that pass the feasibility check as the feasible paths.

The processor can determine (1046) that a difference between respective lengths of a first feasible path and a second feasible path causes interference in reception of the signal. The second feasible path is longer than the first feasible path. The interference can be misinterpreted as additional time shift of the signal from the first feasible path in calculating a timing of the signal. The additional time shift can include additional time delay, or, in some cases, additional time advance. The time advance may be caused by various assumptions and conditions in calculating the timing. Determining that the difference between respective lengths of the first feasible path and the second feasible path causes interference can include determining, by the processor, that the difference is sufficiently small based on facet data representing one or more facets of one or more physical objects in an RF environment.

The processor can determine (1048) a shift correction for adjusting the timing of the signal. The shift correction can include an amount of the additional time shift (including time delay or time advance) to be removed from the timing of the signal. The processor can determine the amount of the additional time shift according to the difference in lengths of the first and second feasible paths. The processor can provide the shift correction to a navigation solver for determining a location of the RF receiver based on the timing of the signal and the shift correction.

Exemplary Mobile Device Architecture

Figure 11:
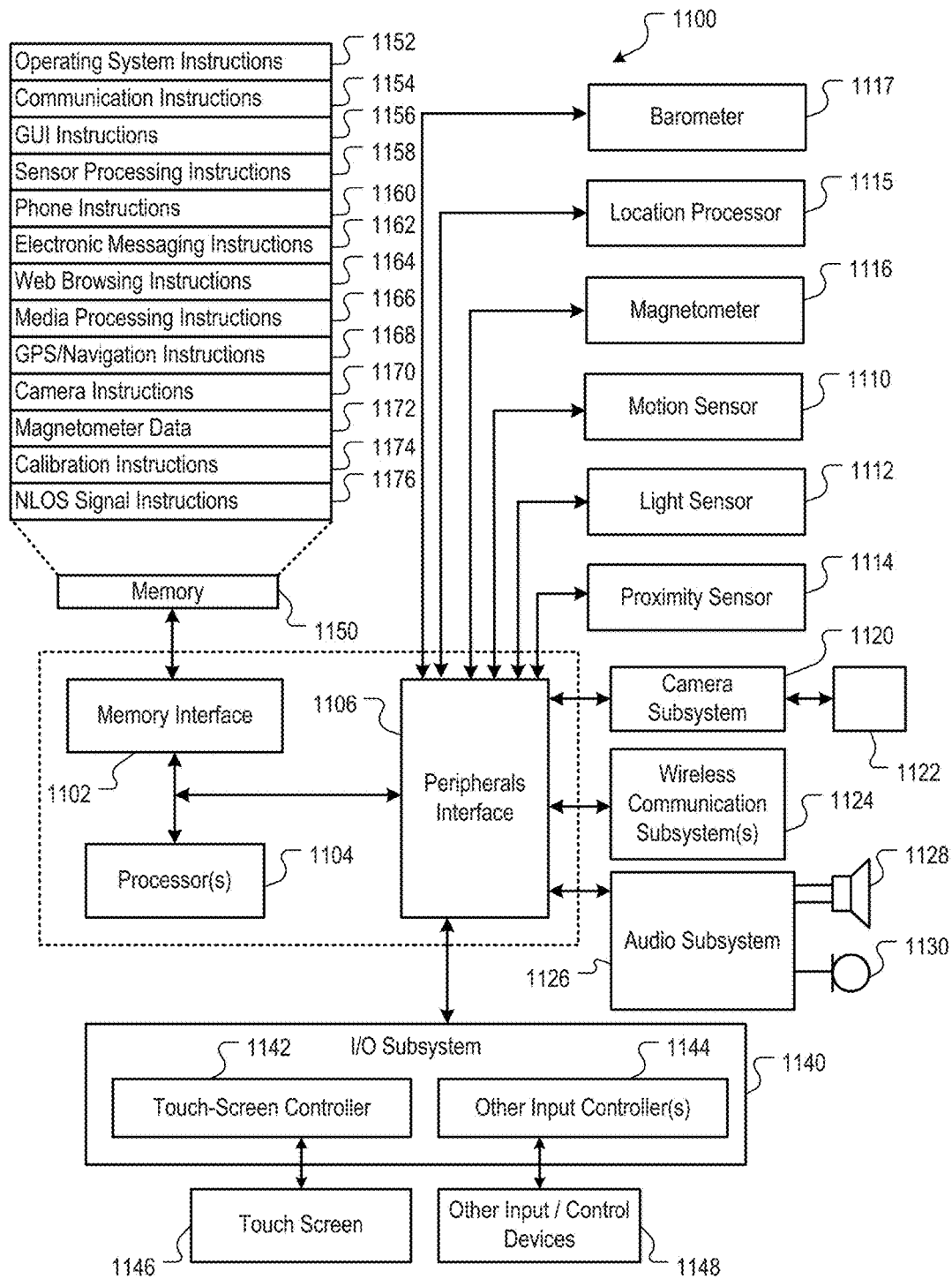
FIG. 11 is a block diagram illustrating an example device architecture of a mobile device implementing the features and operations described in reference to FIGS. 1-10C.

FIG. 11 is a block diagram illustrating an exemplary device architecture 1100 of a mobile device implementing the features and operations described in reference to FIGS. 1-10C. A mobile device can include memory interface 1102, one or more data processors, image processors and/or processors 1104 and peripherals interface 1106. Memory interface 1102, one or more processors 1104 and/or peripherals interface 1106 can be separate components or can be integrated in one or more integrated circuits. Processors 1104 can include application processors, baseband processors and wireless processors. The various components in the mobile device, for example, can be coupled by one or more communication buses or signal lines. Processors 1104 can include processor 100.

Sensors, devices and subsystems can be coupled to peripherals interface 1106 to facilitate multiple functionalities. For example, motion sensor 1110, light sensor 1112 and proximity sensor 1114 can be coupled to peripherals interface 1106 to facilitate orientation, lighting and proximity functions of the mobile device. Location processor 1115 (e.g., GPS receiver) can be connected to peripherals interface 1106 to provide geopositioning. In some implementations, location processor 1115 can be program to perform the operations of location solver or NLOS signal processing or both. Electronic magnetometer 1116 (e.g., an integrated circuit chip) can also be connected to peripherals interface 1106 to provide data that can be used to determine the direction of magnetic North. Thus, electronic magnetometer 1116 can be used as an electronic compass. Motion sensor 1110 can include one or more accelerometers configured to determine change of speed and direction of movement of the mobile device. Barometer 1117 can include one or more devices connected to peripherals interface 1106 and configured to measure pressure of atmosphere around the mobile device.

Camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which a mobile device is intended to operate. For example, a mobile device can include communication subsystems 1124 designed to operate over a GSM network, a GPRS network, an EDGE network, a Wi-Fi™ or WiMax™ network and a Bluetooth™ network. In particular, the wireless communication subsystems 1124 can include hosting protocols such that the mobile device can be configured as a base station for other wireless devices.

Audio subsystem 1126 can be coupled to a speaker 1128 and a microphone 1130 to facilitate voice-enabled functions, such as voice recognition, voice replication, digital recording and telephony functions. Audio subsystem 1126 can be configured to receive voice commands from the user.

I/O subsystem 1140 can include touch surface controller 1142 and/or other input controller(s) 1144. Touch surface controller 1142 can be coupled to a touch surface 1146 or pad. Touch surface 1146 and touch surface controller 1142 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1146. Touch surface 1146 can include, for example, a touch screen.

Other input controller(s) 1144 can be coupled to other input/control devices 1148, such as one or more buttons, rocker switches, thumb-wheel, infrared port, USB port and/or a pointer device such as a stylus. The one or more buttons (not shown) can include an up/down button for volume control of speaker 1128 and/or microphone 1130.

In one implementation, a pressing of the button for a first duration may disengage a lock of the touch surface 1146; and a pressing of the button for a second duration that is longer than the first duration may turn power to the mobile device on or off. The user may be able to customize a functionality of one or more of the buttons. The touch surface 1146 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 1102 can be coupled to memory 1150. Memory 1150 can include high-speed random access memory and/or non-volatile memory, such as one or more magnetic disk storage devices, one or more optical storage devices and/or flash memory (e.g., NAND, NOR). Memory 1150 can store operating system 1152, such as iOS, Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 can include a kernel (e.g., UNIX kernel).

Memory 1150 may also store communication instructions 1154 to facilitate communicating with one or more additional devices, one or more computers and/or one or more servers. Memory 1150 may include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Location instructions 1168 to facilitate generic GNSS and location-related processes and instructions; camera instructions 1170 to facilitate camera-related processes and functions; magnetometer data 1172 and calibration instructions 1174 to facilitate magnetometer calibration. The memory 1150 may also store other software instructions (not shown), such as security instructions, web video instructions to facilitate web video-related processes and functions and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1150. Memory 1150 can store NLOS signal processing instructions 1176 that, when executed by processor 1104, can cause processor 1104 to perform operations of location solver, NLOS signal processing or both as described above.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of the mobile device may be implemented in hardware and/or in software, including in one or more signal processing and/or application specific integrated circuits.

Exemplary Operating Environment

Figure 12:
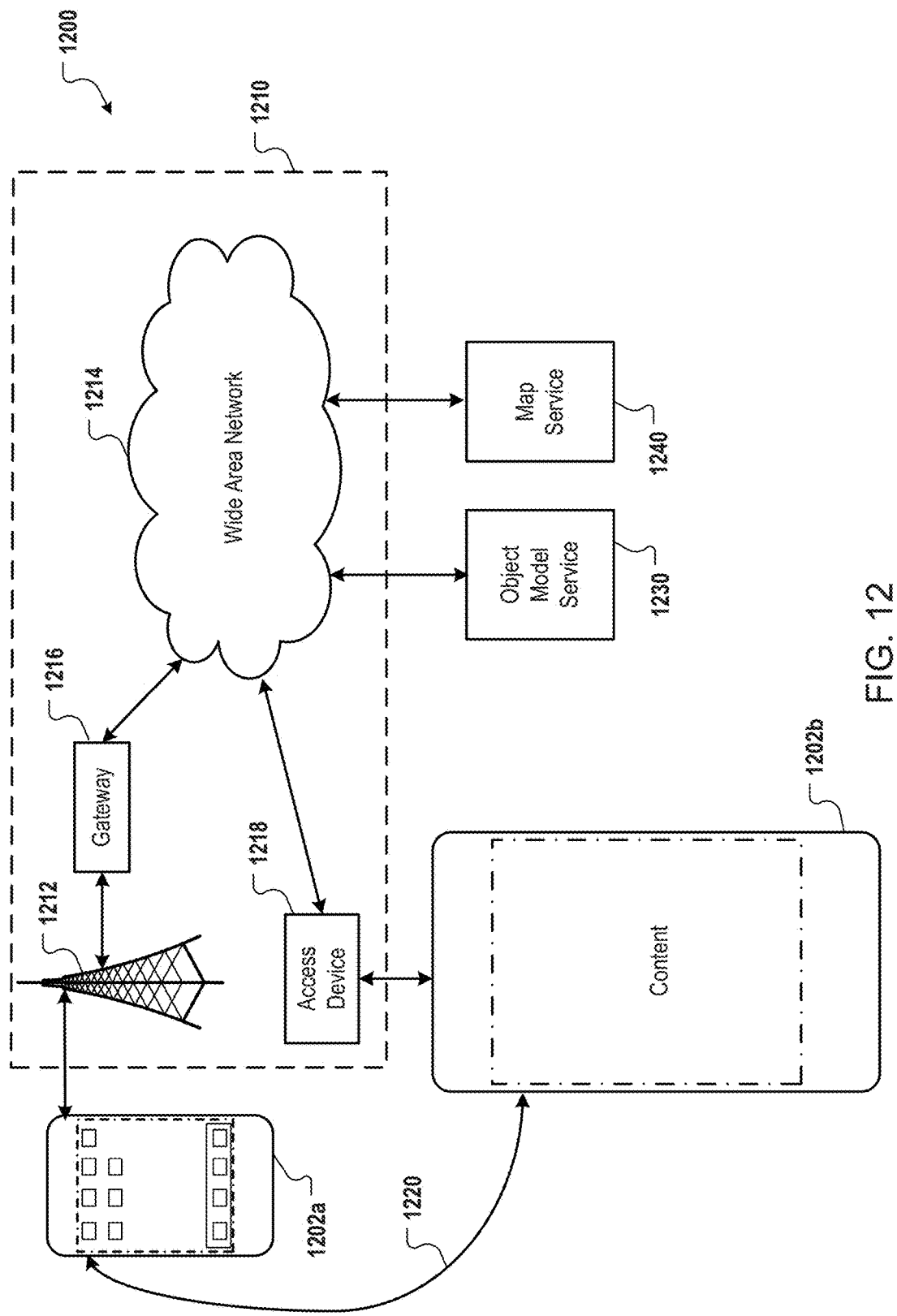
FIG. 12 is a block diagram of an example network operating environment for the mobile devices of FIGS. 1-10C.

FIG. 12 is a block diagram of an exemplary network operating environment 1200 for the mobile devices of FIGS. 1-11. Mobile devices 1202a and 1202b can, for example, communicate over one or more wired and/or wireless networks 1210 in data communication. For example, a wireless network 1212, e.g., a cellular network, can communicate with a wide area network (WAN) 1214, such as the Internet, by use of a gateway 1216. Likewise, an access device 1218, such as an 802.11g or 802.11n wireless access point, can provide communication access to the wide area network 1214. Each of mobile devices 1202a and 1202b can be the mobile device as described above in reference to FIG. 11.

In some implementations, both voice and data communications can be established over wireless network 1212 and the access device 1218. For example, mobile device 1202a can place and receive phone calls (e.g., using voice over Internet Protocol (VoIP) protocols), send and receive e-mail messages (e.g., using Post Office Protocol 3 (POP3)) and retrieve electronic documents and/or streams, such as web pages, photographs and videos, over wireless network 1212, gateway 1216 and wide area network 1214 (e.g., using Transmission Control Protocol/Internet Protocol (TCP/IP) or User Datagram Protocol (UDP)). Likewise, in some implementations, the mobile device 1202b can place and receive phone calls, send and receive e-mail messages and retrieve electronic documents over the access device 1218 and the wide area network 1214. In some implementations, mobile device 1202a or 1202b can be physically connected to the access device 1218 using one or more cables and the access device 1218 can be a personal computer. In this configuration, mobile device 1202a or 1202b can be referred to as a "tethered" device.

Mobile devices 1202a and 1202b can also establish communications by other means. For example, wireless device 1202a can communicate with other wireless devices, e.g., other mobile devices, cell phones, etc., over the wireless network 1212. Likewise, mobile devices 1202a and 1202b can establish peer-to-peer communications 1220, e.g., a personal area network, by use of one or more communication subsystems, such as the Bluetooth™ communication devices. Other communication protocols and topologies can also be implemented.

The mobile device 1202a or 1202b can, for example, communicate with one or more services 1230 and 1240 over the one or more wired and/or wireless networks. For example, one or more object model services 1230 can provide service for determining visible and relevant facets for each of multiple locations by pre-compute facet data and populate a facet database. Mobile device 1202a or 1202b can determine the visible and relevant facets by performing a lookup in the facet database. Map service 1240 can provide information, e.g., location, size, shape, height of buildings for the object model services 1230 to determine the facets.

Mobile device 1202a or 1202b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1202a or 1202b. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations of the invention have been described. Nevertheless, it will be understood that various modifications can be made without departing from the spirit and scope of the invention.

What is claimed is:

1. A method comprising:
   receiving, by a processor, an initial location bound of a radio frequency (RF) receiver, the initial location bound enclosing a plurality of candidate locations of the RF receiver;
   determining, by the processor, a respective set of feasible paths for an RF signal to reach from an RF transmitter to the RF receiver at each of the candidate locations, the set of feasible paths including different paths of the signal caused by the signal reflecting off different surfaces of physical objects, wherein determining the respective set of feasible paths includes:
      constructing a respective tree data structure for each candidate location, each tree data structure representing a plurality of hypothetical paths for the signal to reach from a location of the RF transmitter to the candidate location of the RF receiver;
   performing a feasibility check on each hypothetical path represented in the tree data structure; and
      designating hypothetical paths that pass the feasibility check as the feasible paths;
   determining that a difference between respective lengths of a first feasible path and a second feasible path is less than a threshold difference based on facet data representing one or more facets of one or more physical objects in an RF environment;
   determining a shift correction for adjusting a timing of the signal, the shift correction including an amount of an additional time shift to be removed from the timing of the signal, the amount of the additional time shift being determined according to the difference in lengths of the first and second feasible paths; and
   providing the shift correction to a navigation solver for determining a location of the RF receiver based on the timing of the signal and the shift correction for removing effects caused by the additional time shift.

2. The method of claim 1, wherein the processor is configured to process global navigation satellite system (GNSS) signals, the RF transmitter includes a transmitter of a GNSS satellite and the RF receiver includes an antenna configured to receive the GNSS signals.

3. The method of claim 2, wherein the initial location bound is determined using at least one of GNSS signals, motion sensor data, magnetometer data, Wi-Fi™ data, cellular data or user input data.

4. The method of claim 1, wherein constructing each tree data structure comprises:
   representing a candidate location corresponding to the tree data structure as a root node of the tree data structure;
   determining, from the facet data, one or more facets visible at the candidate location, the one or more facets, each facet corresponding to a reflective surface of a physical object;
   representing the one or more visible facets as children nodes of the root node; and
   representing a location of the RF transmitter as at least one leaf node of the tree data structure, wherein each path from a leaf node to the root node represents a hypothetical signal path, and wherein a depth of the tree data structure corresponds to a maximum number of reflections of the signal to be considered.

5. The method of claim 1, wherein the additional time shift includes additional time delay or additional time advance.

6. A system comprising:
   one or more processors; and
   a non-transitory computer-readable medium storing instructions that, when executed by the one or more processors, cause the one or more processors to perform operations comprising:
   receiving an initial location bound of a radio frequency (RF) receiver, the initial location bound enclosing a plurality of candidate locations of the RF receiver;
   determining a respective set of feasible paths for an RF signal to reach from an RF transmitter to the RF receiver at each of the candidate locations, the set of feasible paths including different paths of the signal caused by the signal reflecting off different surfaces of physical objects, wherein determining the respective set of feasible paths includes:
      constructing a respective tree data structure for each candidate location, each tree data structure representing a plurality of hypothetical paths for the signal to reach from a location of the RF transmitter to the candidate location of the RF receiver;
      performing a feasibility check on each hypothetical path represented in the tree data structure; and
      designating hypothetical paths that pass the feasibility check as the feasible paths;
   determining that a difference between respective lengths of a first feasible path and a second feasible path is less than a threshold difference based on facet data representing one or more facets of one or more physical objects in an RF environment;
   determining a shift correction for adjusting a timing of the signal, the shift correction including an amount of an additional time shift to be removed from the timing of the signal, the amount of the additional time shift being determined according to the difference in lengths of the first and second feasible paths; and
   providing the shift correction to a navigation solver for determining a location of the RF receiver based on the timing of the signal and the shift correction for removing effects caused by the additional time shift.

7. The system of claim 6, wherein the one or more processors are configured to process global navigation satellite system (GNSS) signals, the RF transmitter includes a transmitter of a GNSS satellite and the RF receiver includes an antenna configured to receive the GNSS signals.

8. The system of claim 7, wherein the initial location bound is determined using at least one of GNSS signals, motion sensor data, magnetometer data, Wi-Fi™ data, cellular data or user input data.

9. The system of claim 6, wherein constructing each tree data structure comprises:
representing a candidate location corresponding to the tree data structure as a root node of the tree data structure;
determining, from the facet data, one or more facets visible at the candidate location, the one or more facets, each facet corresponding to a reflective surface of a physical object;
representing the one or more visible facets as children nodes of the root node; and
representing a location of the RF transmitter as at least one leaf node of the tree data structure, wherein each path from a leaf node to the root node represents a hypothetical signal path, and wherein a depth of the tree data structure corresponds to a maximum number of reflections of the signal to be considered.

10. The system of claim 6, wherein the additional time shift includes additional time delay or additional time advance.

11. A non-transitory computer-readable medium storing instructions that, when executed by one or more processors, cause the one or more processors to perform operations comprising:
receiving an initial location bound of a radio frequency (RF) receiver, the initial location bound enclosing a plurality of candidate locations of the RF receiver;
determining a respective set of feasible paths for an RF signal to reach from an RF transmitter to the RF receiver at each of the candidate locations, the set of feasible paths including different paths of the signal caused by the signal reflecting off different surfaces of physical objects, wherein determining the respective set of feasible paths includes:
constructing a respective tree data structure for each candidate location, each tree data structure representing a plurality of hypothetical paths for the signal to reach from a location of the RF transmitter to the candidate location of the RF receiver;
performing a feasibility check on each hypothetical path represented in the tree data structure; and
designating hypothetical paths that pass the feasibility check as the feasible paths;
determining that a difference between respective lengths of a first feasible path and a second feasible path is less than a threshold difference based on facet data representing one or more facets of one or more physical objects in an RF environment;
determining a shift correction for adjusting a timing of the signal, the shift correction including an amount of an additional time shift to be removed from the timing of the signal, the amount of the additional time shift being determined according to the difference in lengths of the first and second feasible paths; and
providing the shift correction to a navigation solver for determining a location of the RF receiver based on the timing of the signal and the shift correction for removing effects caused by the additional time shift.

12. The non-transitory computer-readable medium of claim 11, wherein the one or more processors are configured to process global navigation satellite system (GNSS) signals, the RF transmitter includes a transmitter of a GNSS satellite, the RF receiver includes an antenna configured to receive the GNSS signals, and the initial location bound is determined using at least one of GNSS signals, motion sensor data, magnetometer data, Wi-Fi™ data, cellular data or user input data.

13. The non-transitory computer-readable medium of claim 11, wherein constructing each tree data structure comprises:
representing a candidate location corresponding to the tree data structure as a root node of the tree data structure;
determining, from the facet data, one or more facets visible at the candidate location, the one or more facets, each facet corresponding to a reflective surface of a physical object;
representing the one or more visible facets as children nodes of the root node; and
representing a location of the RF transmitter as at least one leaf node of the tree data structure, wherein each path from a leaf node to the root node represents a hypothetical signal path, and wherein a depth of the tree structure corresponds to a maximum number of reflections of the signal to be considered.

* * * * *